United States Patent
Ranjan et al.

(10) Patent No.: US 12,425,958 B2
(45) Date of Patent: Sep. 23, 2025

(54) UE ENHANCEMENT PRIORITIZING 5G NR CELL SELECTION

(71) Applicant: QUALCOMM Incorporated, San Diego, CA (US)

(72) Inventors: Sharda Ranjan, Hyderabad (IN); Naga Chandan Babu Gudivada, Hyderabad (IN); Kuo-Chun Lee, San Diego, CA (US); Ozcan Ozturk, San Diego, CA (US); Xipeng Zhu, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 17/919,725

(22) PCT Filed: Apr. 21, 2021

(86) PCT No.: PCT/US2021/028453
§ 371 (c)(1),
(2) Date: Oct. 18, 2022

(87) PCT Pub. No.: WO2021/216751
PCT Pub. Date: Oct. 28, 2021

(65) Prior Publication Data
US 2023/0180072 A1    Jun. 8, 2023

(30) Foreign Application Priority Data
Apr. 24, 2020  (IN) .............................. 202041017612

(51) Int. Cl.
*H04W 48/18*    (2009.01)
(52) U.S. Cl.
CPC ................................. *H04W 48/18* (2013.01)

(58) Field of Classification Search
CPC .... H04W 48/16; H04W 48/18; H04W 84/042
See application file for complete search history.

(56) References Cited

U.S. PATENT DOCUMENTS

2017/0289898 A1    10/2017    Youn et al.
2018/0063774 A1    3/2018    Gupta et al.

FOREIGN PATENT DOCUMENTS

EP         2744273 A1    6/2014

OTHER PUBLICATIONS

CMCC, et al., "38.331 CR to Introduce Alternative Cell Reselection Priority for SA", 3GPP TSG-RAN WG2 Meeting #109bis-e, R2-2003494, 3GPP, Mobile Competence Centre, France, vol. RAN WG2, No. Online Meeting, Apr. 20-Apr. 30, 2020, Apr. 10, 2020, XP051871426, 19 Pgs, Reason for change Summary of change RRC Release-IEs field descriptions (p. 5) 6.3.1 System information blocks (5182 field description, p. 9) 6. 3.1 System Information Locks '5184 field description, p. 13) 6.3.1 System information blocks (SIBS field description, p. 16).

(Continued)

*Primary Examiner* — Sam Bhattacharya
(74) *Attorney, Agent, or Firm* — Arun Swain

(57) ABSTRACT

Aspects of the disclosure relate to mechanisms for enhancement in UE cell selection to prioritize cells supporting 5G New Radio (NR) in standalone mode (SA) and in non-standalone (NSA) mode. In some examples, a UE may identify a plurality of cells within an area including a location of the UE. Each cell supports at least one radio access technology (RAT) and at least one frequency. The UE may determine a selection order of the plurality of cells based on the supported RATs and frequency bands to prioritize cells supporting the latest RAT (e.g., 5G NR) and select a serving cell based on the selection order.

28 Claims, 11 Drawing Sheets

(56) References Cited

OTHER PUBLICATIONS

HUAWEI: "Cell Selection for NR Non-Standalone and NR standalone UE Operation," 3GPP Draft, 3GPP TSG-RAN WG2 Meeting #96, R2-168569, Cell Selection for NR Non-Standalone and NR standalone UE Operation, 3rd Generation Partnership Project (3GPP), Mobile Competence Centre, 650, Route Des Lucioles, F-06921 Sophia, vol. RAN WG2, No. Reno, Nevada, US, Nov. 14-Nov. 18, 2016, Nov. 13, 2016, XP051178144, 39 pages, paragraph [0001]—paragraph [0003].
International Search Report and Written Opinion—PCT/US2021/028453—ISA/EPO—Jul. 9, 2021.

UE ENHANCEMENT PRIORITIZING 5G NR CELL SELECTION

CROSS-REFERENCE TO RELATED APPLICATION(S)

This application is the U.S. national stage of PCT patent application number PCT/US21/28453 filed on Apr. 21, 2021, and claims priority to and the benefit of Indian Patent Application number 202041017612 filed in the Indian Patent Office on Apr. 24, 2020, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to cell selection in wireless communication networks.

INTRODUCTION

Upon powering on or recovering from an out-of-service scenario, a user equipment (UE) can attempt to identify and camp on to a cell. Within a particular geographical area, there may be a number of available cells from which the UE can select. Depending on the network deployment, the available cells in an area may support different radio access technologies (RATs) and different frequency bands. For example, a cell may support a 3GPP fourth generation RAT, such as Long Term Evolution (LTE), a 3GPP fifth generation RAT, such as New Radio (NR), or a future RAT. In addition, NR-capable cells may support one or more operating frequency ranges. For example, in 5G NR, two initial operating frequency ranges have been identified as frequency range designations FR1 and FR2.

Initially, 5G NR deployed in a non-standalone (NSA) mode with Evolved-Universal Terrestrial Radio Access New Radio dual connectivity (EN-DC). In EN-DC, the UE may be simultaneously connected to both LTE and NR or to LTE for the control plane and NR for the user plane. The LTE RAT serves as the anchor carrier that allows FR1/FR2 to be added. For example, a UE can perform initial registration with an LTE base station (e.g., evolved Node B (eNB)) that supports the 5G NSA mode, and then add one or more 5G NR cells (e.g., one or more 5G base stations, referred to herein as g Node Bs (gNBs)). Here, the 5G NR radio access network (e.g., 5G NR cell) connects to the 4G Evolved Packet Core (EPC) core network. Later deployments of 5G NR will roll out in standalone (SA) mode, where the 5G NR radio access network connects to a 5G core network. In SA mode, a 5G NR cell may support FR1 or FR2, and in some examples may support dual connectivity of FR1 and FR2 (NR DC).

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a wireless communication device configured for wireless communication in a wireless communication network is disclosed. The wireless communication device includes a transceiver, a memory, and a processor coupled to the transceiver and the memory. The processor and the memory can be configured to identify a plurality of cells within an area including a location of the wireless communication device. Each of the plurality of cells may support at least one radio access technology (RAT) of a plurality of RATs and at least one frequency band of a plurality of frequency bands. The processor and the memory can further be configured to determine a selection order of the plurality of cells based on the at least one RAT and the at least one frequency band supported by each of the plurality of cells, in which the selection order prioritizes a latest generation RAT of the plurality of RATs, and select a serving cell from the plurality of cells for communication therewith via the transceiver based on the selection order.

Another example provides a method of wireless communication in a wireless communication network. The method includes, at a wireless communication device, identifying a plurality of cells within an area including a location of the wireless communication device. Each of the plurality of cells may support at least one radio access technology (RAT) of a plurality of RATs and at least one frequency band of a plurality of frequency bands. The method further includes determining a selection order of the plurality of cells based on the at least one RAT and the at least one frequency band supported by each of the plurality of cells, in which the selection order prioritizes a latest generation RAT of the plurality of RATs, and selecting a serving cell from the plurality of cells for communication therewith based on the selection order.

Another example provides wireless communication device configured for wireless communication in a wireless communication network. The wireless communication device includes means for identifying a plurality of cells within an area including a location of the wireless communication device. Each of the plurality of cells may support at least one radio access technology (RAT) of a plurality of RATs and at least one frequency band of a plurality of frequency bands. The wireless communication device further includes means for determining a selection order of the plurality of cells based on the at least one RAT and the at least one frequency band supported by each of the plurality of cells, in which the selection order prioritizes a latest generation RAT of the plurality of RATs, and means for selecting a serving cell from the plurality of cells for communication therewith based on the selection order.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or

DETAILED DESCRIPTION

Figure 1:
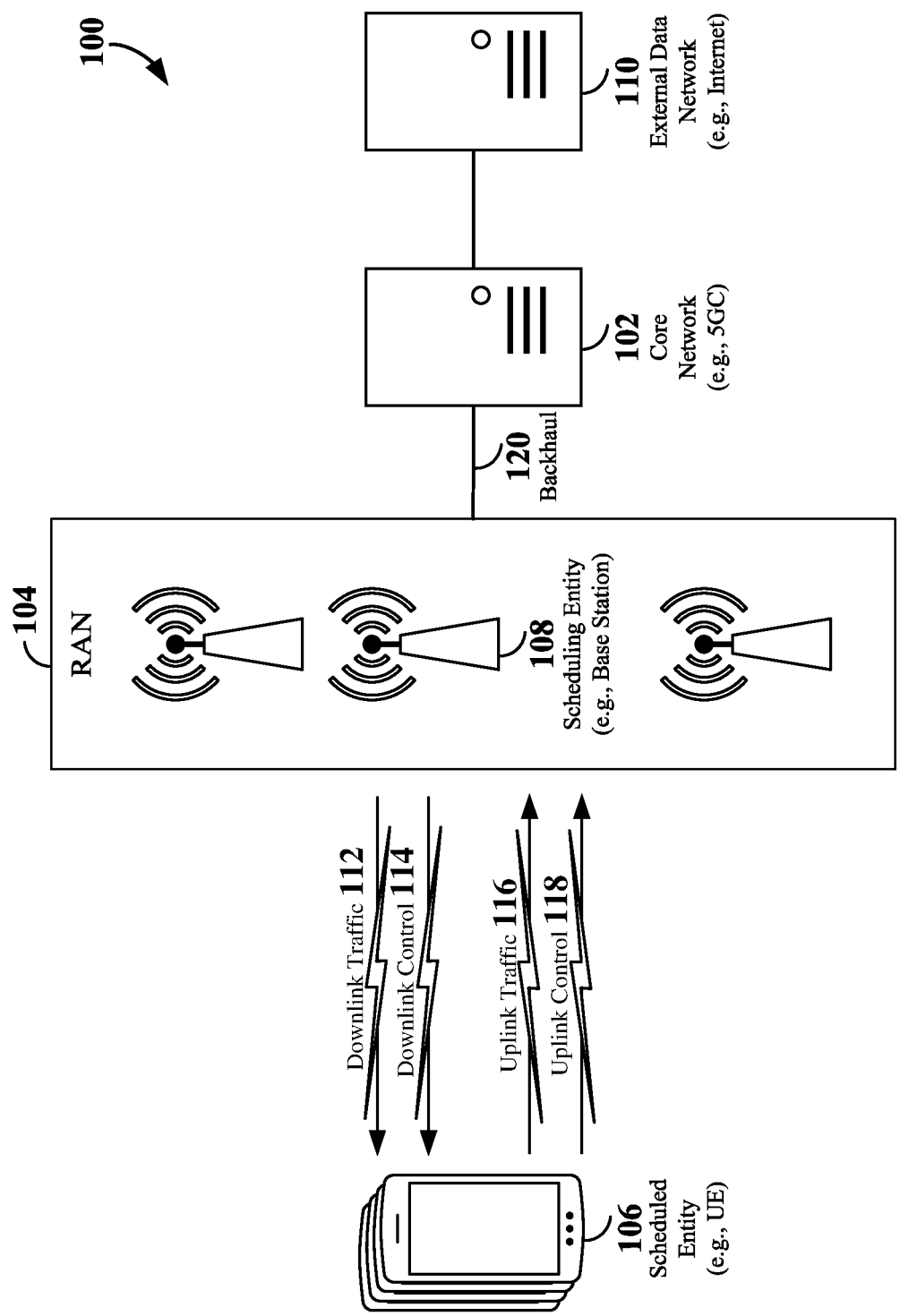
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Various aspects of the disclosure relate to enhancement in UE cell selection to prioritize cells supporting 5G NR in standalone (SA) mode or non-standalone (NSA) mode. In some examples, a UE may identify a plurality of cells within an area including a location of the UE. Each cell supports at least one radio access technology (RAT) (e.g., LTE or 5G NR) and at least one frequency band of at least one frequency range (e.g., FR1, FR2, or LTE). The UE may determine a selection order of the plurality of cells based on the supported RATs and frequency bands to prioritize cells supporting 5G NR. The UE may then select a serving cell based on the selection order and respective cell measurement (e.g., signal strength) of the plurality of cells. In some examples, the selection order is determined based on an order of priority of cell types. For example, the order of priority of cell types may be as follows: NR DC cells (e.g., cells supporting dual connectivity of FR1 and FR2), FR1-only or FR2-only cells operating in licensed spectrum, FR1-only or FR2-only cells operating in unlicensed spectrum, LTE anchor cells supporting EN-DC with FR2, LTE anchor cells supporting EC-DC with FR1, and legacy LTE cells.

In some examples, the UE can further maintain a frequency database including a list of the frequency bands associated with each of the cell types in the order of priority and can further update the list to maintain the order of priority in the list. The UE may further maintain a fingerprint database for storing anchor cell information that indicates anchor cells (e.g., 5G NR or LTE anchor cells) and neighbor FR1/FR2 cells for each 5G NR or LTE anchor cell previously identified in the area. The UE can further update the fingerprint database to include additional neighbor cells of identified anchor cells based on system information (e.g., neighbor cell information) provided by the network. The UE can further perform frequency searches for additional anchor cells periodically and update the fingerprint database accordingly. In addition, the UE may perform idle measurements for cell reselection when an additional anchor cell having a higher priority than the serving cell is discovered. For example, the UE can configure an idle cell measurement on an NR anchor cell (e.g., NR DC cell) supporting FR1 when the serving cell is an FR1-only cell. As another example, the UE can configure an idle measurement on an LTE anchor cell when the serving cell is a legacy LTE cell.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface.

Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
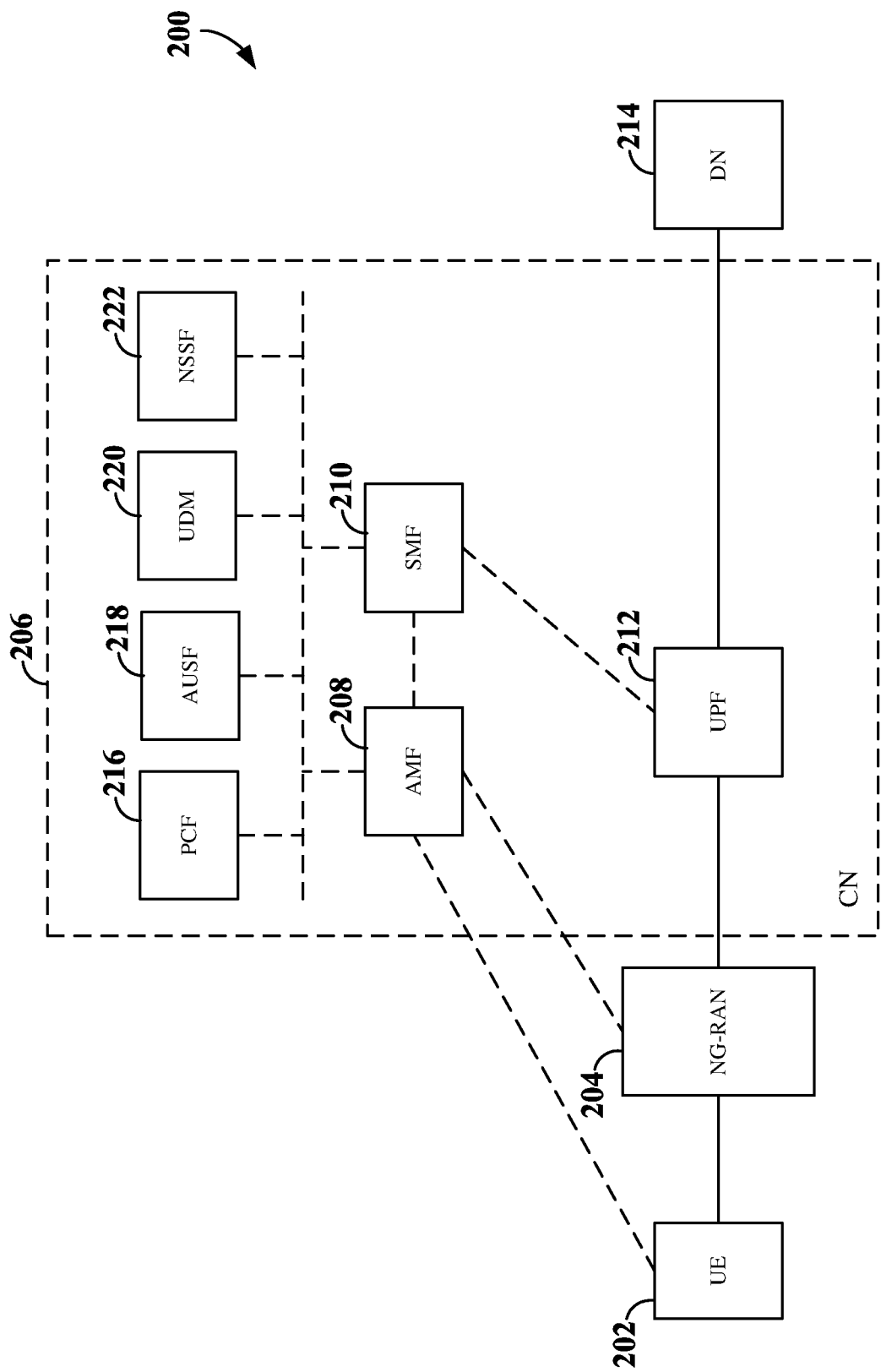
FIG. 2 is a block diagram illustrating an example of a 5G wireless communication system (5GS) according to some aspects.

Referring now to FIG. 2, by way of example and without limitation, a block diagram illustrating an example of various components of a 5G wireless communication system (5GS) 200 is provided. In some examples, the 5GS 200 may be the same wireless communication system 100 described above and illustrated in FIG. 1. The 5GS 200 includes a user equipment (UE) 202, a next generation radio access network (NG-RAN) 204, and a core network 206. By virtue of the wireless communication system 200, the UE 202 may be enabled to carry out data communication with an external data network 214, such as (but not limited to) the Internet, Ethernet network, or a local area network.

The core network 206 may be a 5G core network and may include, for example, an access and mobility management function (AMF) 208, a session management function (SMF) 210, and a user plane function (UPF) 212. The AMF 208 and SMF 210 employ control plane (e.g., Non Access Stratum (NAS)) signaling to perform various functions related to mobility management and session management for the UE 202. For example, the AMF 208 provides connectivity, mobility management and authentication of the UE 202, while the SMF 210 provides session management of the UE 202 (e.g., processes signaling related to protocol data unit (PDU) sessions between the UE 202 and the external DN 214). The UPF 212 provides user plane connectivity to route 5G (NR) packets to/from the UE 202 via the NG-RAN 204.

The core network 206 may further include other functions, such as a policy control function (PCF) 216, authentication server function (AUSF) 218, unified data management (UDM) 220, network slice selection function (NSSF) 222, and other functions (not illustrated, for simplicity). The PCF 216 provides policy information (e.g., rules) for control plane functions, such as network slicing, roaming, and mobility management. In addition, the PCF 216 supports 5G quality of service (QoS) policies, network slice policies, and other types of policies. The AUSF 218 performs authentication of UEs 202. The UDM 220 facilitates generation of authentication and key agreement (AKA) credentials, performs user identification and manages subscription information and UE context. In some examples, the AMF 208 includes a co-located security anchor function (SEAF) that allows for re-authentication of a UE 202 when the UE moves between different NG-RANs 204 without having to perform a complete authentication process with the AUSF 218. The NSSF 222 redirects traffic to a network slice. Network slices may be defined, for example, for different classes of subscribers or use cases, such as smart home, Internet of Things (IoT), connected car, smart energy grid, etc. Each use case may receive a unique set of optimized resources and network topology (e.g., a network slice) to meet the connectivity, speed, power, and capacity requirements of the use case.

To establish a connection to the 5G core network 206 via the NG-RAN 204, the UE 202 may transmit a registration request and PDU session establishment request to the 5G core network 206 via the NG-RAN 204. The AMF 208 and SMF 210 may process the registration request and PDU session establishment request and establish a PDU session between the UE 202 and the external DN 214 via the UPF 212. A PDU session may include one or more sessions (e.g., data sessions or data flows) and may be served by multiple UPFs 212 (only one of which is shown for convenience). Examples of data flows include, but are not limited to, IP flows, Ethernet flows and unstructured data flows.

Figure 3:
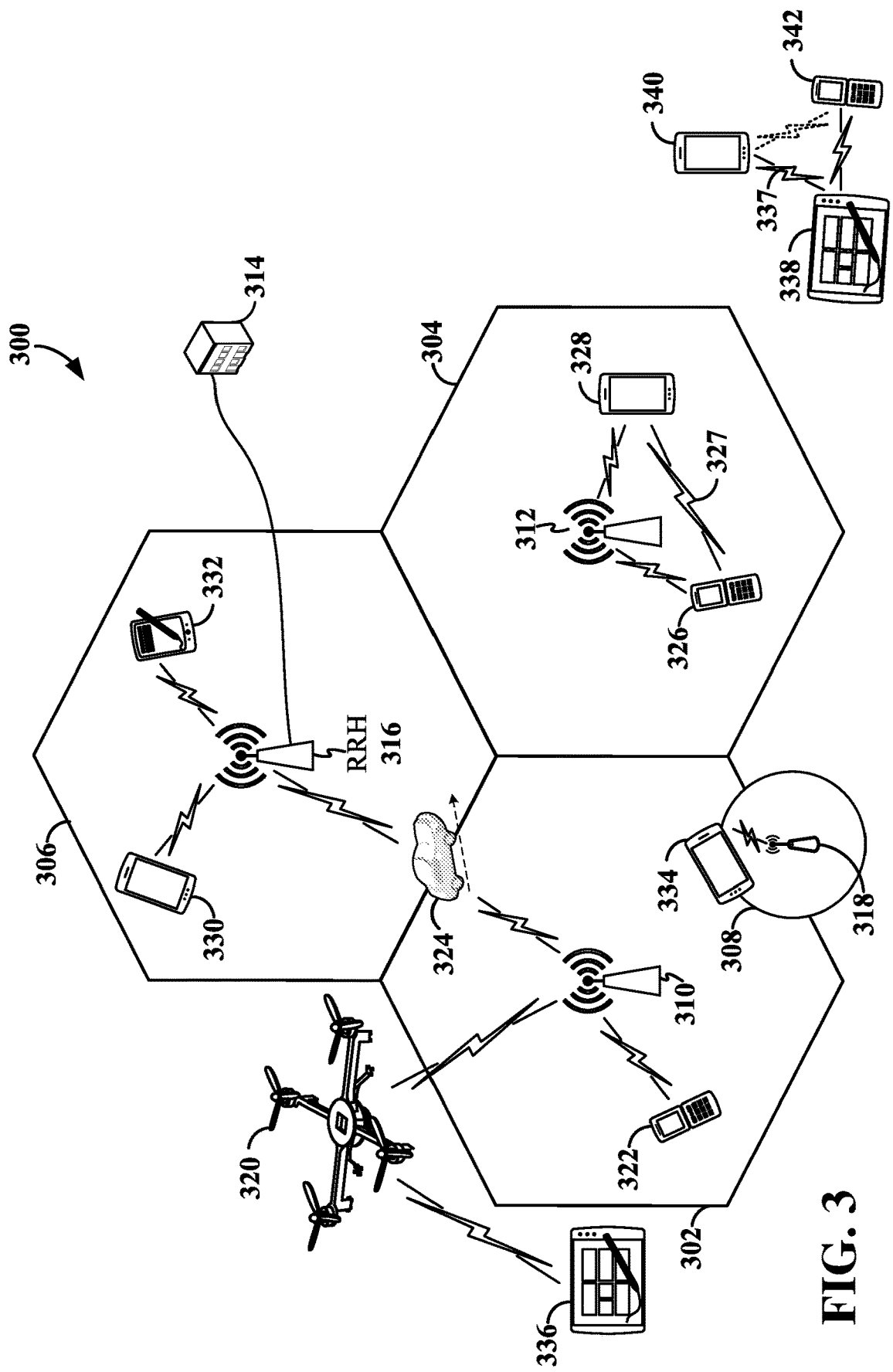
FIG. 3 is a conceptual illustration of an example of a radio access network according to some aspects.

Referring now to FIG. 3, as an illustrative example without limitation, a schematic illustration of a radio access network (RAN) 300 according to some aspects of the disclosure is provided. In some examples, the RAN 300 may be the same as the RAN 104 described above and illustrated in FIG. 1 and/or the NG-RAN 204 described above and illustrated in FIG. 2.

The geographic region covered by the RAN 300 may be divided into a number of cellular regions (cells) that can be uniquely identified by a user equipment (UE) based on an identification broadcasted over a geographical area from one access point or base station. FIG. 3 illustrates cells 302, 304, 306, and 308, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 3, two base stations 310 and 312 are shown in cells 302 and 304. A third base station 314 is shown controlling a remote radio head (RRH) 316 in cell 306. That is, a base station can have an integrated antenna or can be connected to an antenna or RRH by feeder cables. In the illustrated example, the cells 302, 304, and 306 may be referred to as macrocells, as the base stations 310, 312, and 314 support cells having a large size. Further, a base station 318 is shown in the cell 308, which may overlap with one or more macrocells. In this example, the cell 308 may be referred to as a small cell (e.g., a microcell, picocell, femtocell, home base station, home Node B, home eNode B, etc.), as the base station 318 supports a cell having a relatively small size. Cell sizing can be done according to system design as well as component constraints.

It is to be understood that the RAN 300 may include any number of wireless base stations and cells. Further, a relay node may be deployed to extend the size or coverage area of a given cell. The base stations 310, 312, 314, 318 provide wireless access points to a core network for any number of mobile apparatuses. In some examples, the base stations 310, 312, 314, and/or 318 may be the same as or similar to the scheduling entity 108 described above and illustrated in FIG. 1.

FIG. 3 further includes an unmanned aerial vehicle (UAV) 320, which may be a drone or quadcopter. The UAV 320 may be configured to function as a base station, or more specifically as a mobile base station. That is, in some examples, a cell may not necessarily be stationary, and the geographic area of the cell may move according to the location of a mobile base station, such as the UAV 320.

Within the RAN 300, the cells may include UEs that may be in communication with one or more sectors of each cell. Further, each base station 310, 312, 314, 318, and 320 may be configured to provide an access point to a core network (see FIG. 1 and/or 2) for all the UEs in the respective cells. For example, UEs 322 and 324 may be in communication with base station 310; UEs 326 and 328 may be in communication with base station 312; UEs 330 and 332 may be in communication with base station 314 by way of RRH 316; UE 334 may be in communication with base station 318; and UE 336 may be in communication with mobile base station 320. In some examples, the UEs 322, 324, 326, 328, 330, 332, 334, 336, 338, 330, and/or 332 may be the same as the UE/scheduled entity 106 described above and illustrated in FIG. 1 and/or the UE 202 described above and illustrated in FIG. 2.

In some examples, the UAV 320 (e.g., the quadcopter), can be a mobile network node and may be configured to function as a UE. For example, the UAV 320 may operate within cell 302 by communicating with base station 310.

In a further aspect of the RAN 300, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 338, 330, and 332) may communicate with each other using sidelink signals 337 without relaying that communication through a base station. In some examples, the UEs 338, 330, and 332 may each function as a scheduling entity or transmitting sidelink device and/or a scheduled entity or a receiving sidelink device to schedule resources and communicate sidelink signals 337 therebetween without relying on scheduling or control information from a base station. In other examples, two or more UEs (e.g., UEs 326 and 328) within the coverage area of a base station (e.g., base station 312) may also communicate sidelink signals 327 over a direct link (sidelink) without conveying that communication through the base station 312. In this example, the base station 312 may allocate resources to the UEs 326 and 328 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 300, the ability for UEs to communicate while moving, independent of their location, is referred to as mobility. The various physical channels between the UE and the RAN 300 are generally set up, maintained, and released under the control of the AMF 208, illustrated in FIG. 2. In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 300 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 324 may move from the geographic area corresponding to its serving cell 302 to the geographic area corresponding to a neighbor cell 306. When the signal strength or quality from the neighbor cell 306 exceeds that of its serving cell 302 for a given amount of time, the UE 324 may transmit a reporting message to its serving base station 310 indicating this condition. In response, the UE 324 may receive a handover command, and the UE may undergo a handover to the cell 306.

In a network configured for UL-based mobility, UL reference signals from each UE may be utilized by the network to select a serving cell for each UE. In some examples, the base stations 310, 312, and 314/316 may broadcast unified synchronization signals (e.g., unified Primary Synchronization Signals (PSSs), unified Secondary Synchronization Signals (SSSs) and unified Physical Broadcast Channels (PBCH)). The UEs 322, 324, 326, 328, 330, and 332 may receive the unified synchronization signals, derive the carrier frequency and slot timing from the synchronization signals, and in response to deriving timing, transmit an uplink pilot or reference signal. The uplink pilot signal transmitted by a UE (e.g., UE 324) may be concurrently received by two or more cells (e.g., base stations 310 and 314/316) within the radio access network 300. Each of the cells may measure a strength of the pilot signal, and the radio access network (e.g., one or more of the base stations 310 and 314/316 and/or a central node within the core network) may determine a serving cell for the UE 324. As the UE 324 moves through the RAN 300, the RAN 300 may continue to monitor the uplink pilot signal transmitted by the UE 324. When the signal strength or quality of the pilot signal measured by a neighboring cell exceeds that of the signal strength or quality measured by the serving cell, the network 300 may handover the UE 324 from the serving cell to the neighboring cell, with or without informing the UE 324.

Although the synchronization signal transmitted by the base stations 310, 312, and 314/316 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 300 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 300 may utilize one or more multiplexing techniques and multiple access algorithms to enable simultaneous communication of the various devices. For example, 5G NR specifications provide multiple access for UL transmissions from UEs 322 and 324 to base station 310, and for multiplexing for DL transmissions from base station 310 to one or more UEs 322 and 324, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 310 to UEs 322 and 324 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 300 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

The air interface may further use one or more frequency ranges, including FR1, FR2 or a legacy LTE frequency range. For example, the LTE frequency range may include the E-UTRA frequency bands between 350 MHz and 3.8 GHz. In some examples, each cell may support a single frequency range (e.g., FR1, FR2 or legacy LTE) and may further support one or more frequency bands (e.g., carrier frequencies) within a particular frequency range. In addition, one or more cells may operate as anchor cells enabling dual connectivity with neighbor cell(s) supporting a different frequency range. In some examples, one or more cells may be NR dual connectivity (NR DC) cells that support dual connectivity between FR1 and FR2 (e.g., FR1+FR2 DC). For example, a NR DC anchor cell may be configured for communication with UEs in the cell over FR1, and may further support dual connectivity by the UEs to enable simultaneous communication over FR1 with the NR DC anchor cell and over FR2 with one or more neighbor NR cells. In other examples, one or more cells may be Evolved-Universal Terrestrial Radio Access New Radio dual connectivity (EN-DC) that support dual connectivity between an LTE frequency band and either FR1 or FR2, as described in more detail below in connection with FIG. 5. For example, an LTE anchor cell may be configured for communication with UEs in the cell over an LTE frequency band, and may further support dual connectivity by the UEs to enable simultaneous communication over the LTE frequency band with the LTE anchor cell and over either FR1 or FR2 with one or more neighbor NR cells.

In order for a UE to gain initial access to a cell, the RAN 300 may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand In some examples, the MSI may be provided over two different downlink channels. For example, a physical broadcast control channel (PBCH) may carry a master information block (MIB), and a physical downlink shared channel (PDSCH) may carry a system information block type 1 (SIB1). In the art, SIB1 may be referred to as the remaining minimum system information (RMSI). OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
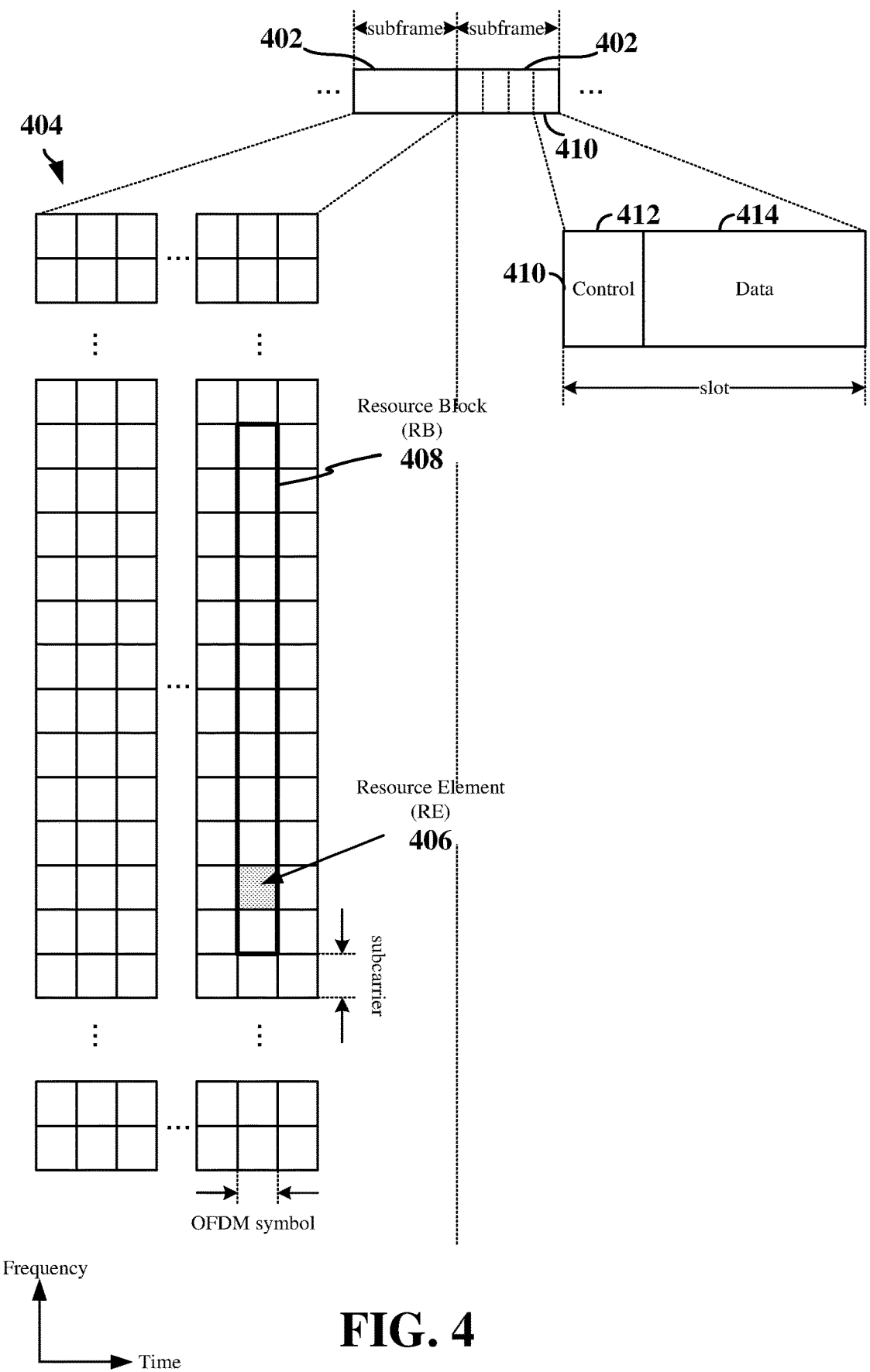
FIG. 4 is a schematic illustration of an organization of wireless resources in an air interface utilizing orthogonal frequency divisional multiplexing (OFDM) according to some aspects.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 4, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a proximity service (ProSe) PC4 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 4 are not necessarily all of the channels or carriers that may be utilized between devices, and those of ordinary skill in the art will recognize that other channels or carriers may be utilized in addition to those illustrated, such as other traffic, control, and feedback channels.

Figure 5:
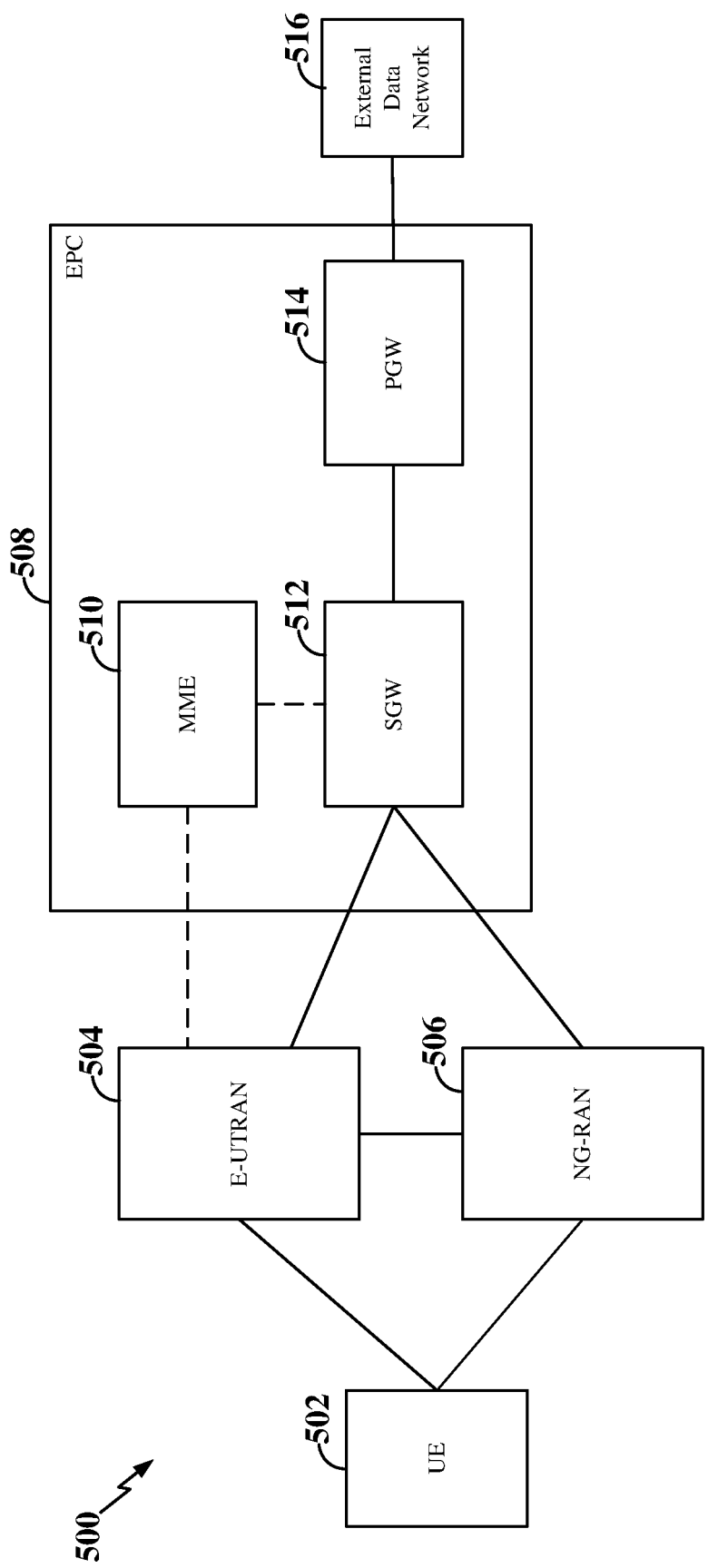
FIG. 5 is a block diagram illustrating an example of an EN-DC system according to some aspects.

Referring now to FIG. 5, by way of example and without limitation, a block diagram illustrating an example of various components of an EN-DC system 500 is provided. In some examples, the EN-DC system 500 may be the same wireless communication system 100 described above and illustrated in FIG. 1. The EN-DC system 500 includes a user equipment (UE) 502, a NG-RAN 506 (e.g., a gNB), an LTE RAN (E-UTRAN) 504 (e.g., an eNB), and a core network 508. By virtue of the wireless communication system 500, the UE 502 may be enabled to carry out data communication with an external data network 516, such as (but not limited to) the Internet, Ethernet network, or a local area network.

The core network 508 may be an Evolved Packet Core (EPC) and may include, for example, a mobility management entity (MME) 510, a serving gateway (SGW) 512 and a packet data network gateway (PGW) 514. The MME 510 is the control node that processes the signaling between the UE 502 and the EPC 508. Generally, the MME 510 provides bearer and connection management for the UE 502 according to mechanisms defined for the EPC 508. For example, the MME 510 may manage security when the UE 502 connects to the E-UTRAN 504 by using information provided by a Home Subscriber Server (HSS, not shown) to authenticate UEs and update UEs location information in the HSS. The MME 510 may further maintain the tracking area identity (TAI) of the current tracking area (e.g., group of neighboring cells/eNBs) within which the UE 502 is located to enable paging of the UE 502 when the UE is in idle mode. Moreover, the MME 510 may manage connectivity via Packet Data Connections (PDNs) between the UE 502 and the PGW 514, and determine and provide a set of Quality of Service (QoS) parameters to the E-UTRAN 504.

To establish a connection to the EPC 508 via the E-UTRAN 504, the UE 502 may transmit a registration request and PDN session establishment request to the EPC 508 via the E-UTRAN 504. The MME 510 may process the registration request and PDN session establishment request and establish a PDN session between the UE 502 and the external DN 516 via the SGW 512 and PGW 514.

To enable dual connectivity, the 4G LTE infrastructure (e.g., E-UTRAN eNB 504 and EPC 508) supports a connection to the NG-RAN 506 (e.g., a 5G NR gNB). Here, the NG-RAN gNB 506 connects to the EPC 508 at the data plane level through the SGW 512. The NG-RAN gNB 506 does not connect to the MME 510, and as such, does not have a control plane connection to the EPC 508. The NG-RAN gNB 506 connects to the E-UTRAN eNB 504 to activate and deactivate 5G bearers. Therefore, the NG-RAN eNB acts as an anchor or master node and the NG-RAN gNB acts as a secondary node. Here, the E-UTRAN eNB 504 may be configured for communication with the UE 502 using an LTE frequency band, while the NG-RAN gNB 506 may be configured for communication with the UE 502 using a NR frequency band (e.g., FR1 or FR2).

In an example, after the UE 502 camps on to the E-UTRAN eNB 504, the UE can signal to the EPC 508 (e.g., the MME 510), that the UE 502 is capable of simultaneous connection to both the E-UTRAN 504 and NG-RAN 506. The MME 510 confirms that the UE 502 is authorized for dual connectivity and notifies the E-UTRAN eNB 504 that the UE 502 is permitted to connect to the NG-RAN 506. The E-UTRAN eNB 504 may then communicate with the NG-RAN gNB 506 to activate a bearer on the NG-RAN gNB 506. The UE 502 can then receive a radio resource control (RRC) reconfiguration message assigning the 5G bearer to the UE 502. The UE 502 can then access the NG-RAN gNB 506 using a random access procedure to establish simultaneous dual connectivity to both the E-UTRAN eNB 504 and NG-RAN gNB 506. Additional secondary nodes (e.g., other gNBs) may also be added using a similar procedure.

Figure 6:
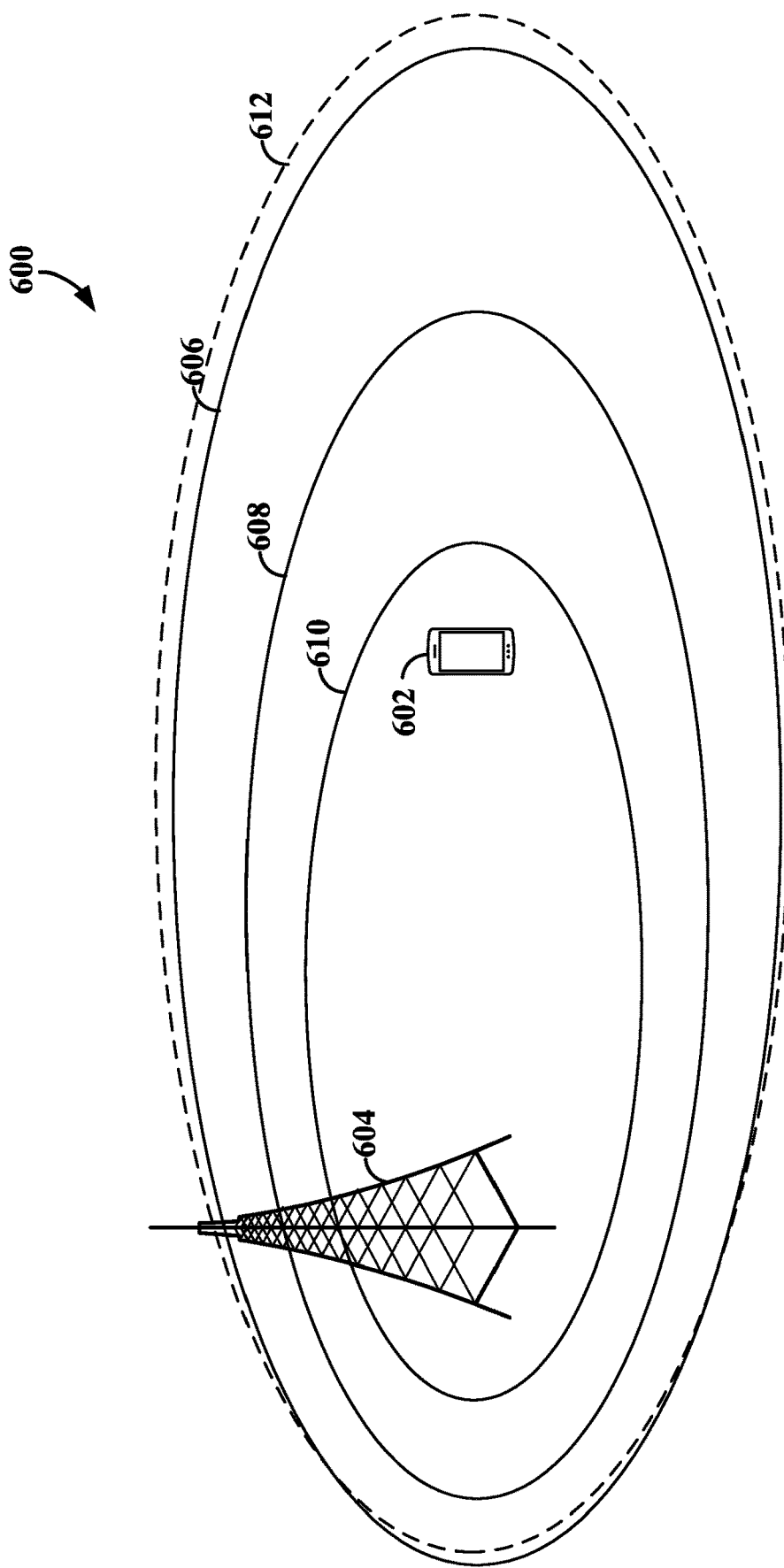
FIG. 6 is a diagram illustrating a multi-RAT deployment environment according to some aspects.

FIG. 6 is a diagram illustrating a multi-RAT deployment environment 600 according to some aspects. In the multi-RAT deployment environment 600 shown in FIG. 6, a UE 602 may communicate with a base station 604 using one or more of a plurality of RATs. For example, the base station 604 may include a plurality of co-located TRPs, each serving a respective cell 606, 608, and 610. Each cell 606, 608, and 610 may communicate using a respective RAT and corresponding frequency range. In some examples, the RATs may include LTE and NR. For example, a first cell 606 may be an LTE cell that operates in an LTE frequency range to provide wide area coverage to the UE 602. In addition, a second cell 608 may be a NR cell that operates in a sub-6 GHz frequency range (e.g., FR1), and a third cell 610 may be a NR cell that operates in a mmWave frequency range (e.g., FR2 or higher).

In some examples, the UE 602 may communicate with the base station 604 over two or more of the cells 606, 608, and 610 in a multi-RAT dual connectivity (MR-DC) mode, such as EN-DC, as described above. EN-DC may be utilized in a non-standalone (NSA) mode of 5G NR in which the UE 602 is simultaneously connected to both LTE and NR or to LTE for the control plane and NR for the user plane. In EN-DC, the LTE cell (e.g., cell 606) may be referred to as the anchor cell that provides a radio resource control (RRC) connection to the UE 602. The anchor cell 606 may activate or add one or more additional NR cells (e.g., cells 608 and/or 610) to provide 5G services to the UE 602. In an example, the UE 602 may simultaneously communicate with the LTE anchor cell 606 over an LTE frequency band and with one or more neighbor NR cells (e.g., cells 608 and/or 610) over FR1 and/or FR2.

In other examples, the UE 602 may communicate with the base station 604 in a NR standalone (SA) mode in which LTE is not utilized as the anchor cell. For example, the UE 602 may communicate with the base station 604 in a NR DC mode. As described above, NR DC mode supports dual connectivity between FR1 and FR2 (e.g., FR1+FR2 DC). For example, a UE 602 may be configured for simultaneous communication with an NR anchor cell 608 over FR1 and with one or more neighbor NR cells (e.g., cell 610) over FR2. In other examples, the UE 602 may be configured to communicate over a single one of the NR cells (e.g., cell 608 or 610) using FR1 or FR2.

In some examples, the base station 604 may optionally include both a NSA-eNB serving the LTE NSA anchor cell 606 and a co-located legacy eNB serving a legacy LTE cell 612 (indicated by the dotted lines). Here, the legacy LTE cell 612 may not support NR NSA mode. In this example, the NSA anchor cell 606 may co-exist with a neighbor legacy LTE cell 612 to enable a legacy UE 602 that does not support 5G NR to select the legacy LTE cell 612. In some cases, a UE 602 that supports 5G NR may select the legacy LTE cell 612 instead of the NSA LTE anchor cell 606 due to stronger energy (stronger signal strength) on the legacy LTE cell 612. However, if a 5G NR UE 602 selects the legacy LTE cell 612 first due to the stronger signal strength of the LTE cell 612, the UE 602 may not be able to utilize 5G services. In addition, when the UE 602 is camped on to the legacy LTE cell 612, even if a strong 5G NR neighbor cell exists, the UE 602 may not detect the 5G NR cell (e.g., cell 606, 610, or 612), thus depriving the UE 602 of an enhanced 5G NR experience in terms of throughput, latency, scalability, etc. This may occur as a result of an immature network, where the SSB offset and periodicity provided by the SSB-based radio resource management (RRM) timing configuration (SMTC) window received from the base station 604 via SIB24 and the eNB-gNB gap periodicity are not aligned, resulting in the UE 602 failing to detect the NR SSB/cell.

In addition, not all legacy eNBs may be configured with a NSA-anchor eNB (e.g., as indicated by the base station 604 via SIB5). Thus, the UE 602 may not be able to reselect to a 5G NR capable cell (e.g., NSA anchor LTE cell 606) Similar issues may occur with NR DC. For example, an FR1 cell 608 may not have a neighbor FR2 cell 610 (e.g., the base station/gNB 604 may not have co-located FR1/FR2), so the UE 602 may not be able to operate in NR DC mode.

Therefore, various aspects of the disclosure provide an enhancement in UE cell selection to prioritize cells supporting 5G NR in standalone (SA) mode (e.g., cells 608 and 610) or non-standalone (NSA) mode (e.g., cell 606). In some examples, the UE 602 may determine a selection order of cells 606, 608, 610, and 612 based on the supported RATs and frequency ranges (e.g., LTE frequency range, FR1, FR2, etc.) to prioritize cells supporting 5G NR and select a serving cell based on the selection order and respective signal strength of the cells. For example, the UE 602 may select the serving cell having a signal strength greater than a threshold based on the selection order. In some examples, the selection order is determined based on an order of priority of cell types. For example, the order of priority of cell types may be as follows: NR DC cells (e.g., cells supporting dual connectivity of FR1 and FR2), FR1-only or FR2-only cells operating in licensed spectrum, FR1-only or FR2-only cells operating in unlicensed spectrum, LTE anchor cells supporting EN-DC with FR2, LTE anchor cells supporting EC-DC with FR1, and legacy LTE cells. Thus, in the example shown in FIG. 6, the selection order may be as follows: (1) cell 608; (2) cell 610; (3) cell 606; and (4) cell 612.

In some examples, the UE 602 can maintain a frequency database including a list of the frequency bands of each of the cell types in the order of priority and can further update the list upon discovering new frequency bands to maintain the order of priority in the list. The UE 602 may further maintain a fingerprint database for storing anchor cell information that indicates recently identified anchor cells (e.g., FR1 anchor cells or LTE anchor cells) and neighbor FR1/FR2 cells for each FR1 anchor cell or LTE anchor cell. For example, after camping on to an anchor cell (e.g., LTE anchor cell 606 for EN-DC or NR anchor cell 608 for NR DC), the UE 602 can update the fingerprint database based on neighbor cell information (e.g., SIB2) provided by the anchor cell. For example, the fingerprint database may indicate neighbor cells 608 and 610 for LTE anchor cell 606 and may further indicate neighbor cell 610 for NR anchor cell 608.

The UE 602 can further perform frequency searches for additional anchor cells and update the fingerprint database accordingly. For example, after camping on a non-anchor cell (e.g., an FR1/FR2 only cell or legacy LTE cell), the UE 602 may initiate a frequency search for additional anchor cells to which the UE 602 may reselect. The UE 602 may further perform frequency searches after camping onto an FR1 anchor cell (e.g., cell 608) or LTE anchor cell (e.g., cell 606). The UE may utilize the frequency database and/or the fingerprint database, along with system information (e.g., SIB2 and/or SIB5) to detect more additional anchor cells. The UE 602 may then update the fingerprint database upon detecting at least one additional anchor cell. In some examples, the UE 602 may perform the frequency searches periodically over time.

In addition, the UE 602 may perform idle cell measurements for cell reselection when an anchor cell having a higher priority than the serving cell is detected (e.g., based on the frequency search). For example, the UE 602 can configure an idle cell measurement on another nearby NR anchor cell (not shown) supporting FR1 when the serving cell 608 is an FR1-only cell. As another example, the UE 602 can configure an idle measurement on an LTE anchor cell (e.g., cell 606) when the serving cell is the legacy LTE cell 612.

Figures 7A, 7B:
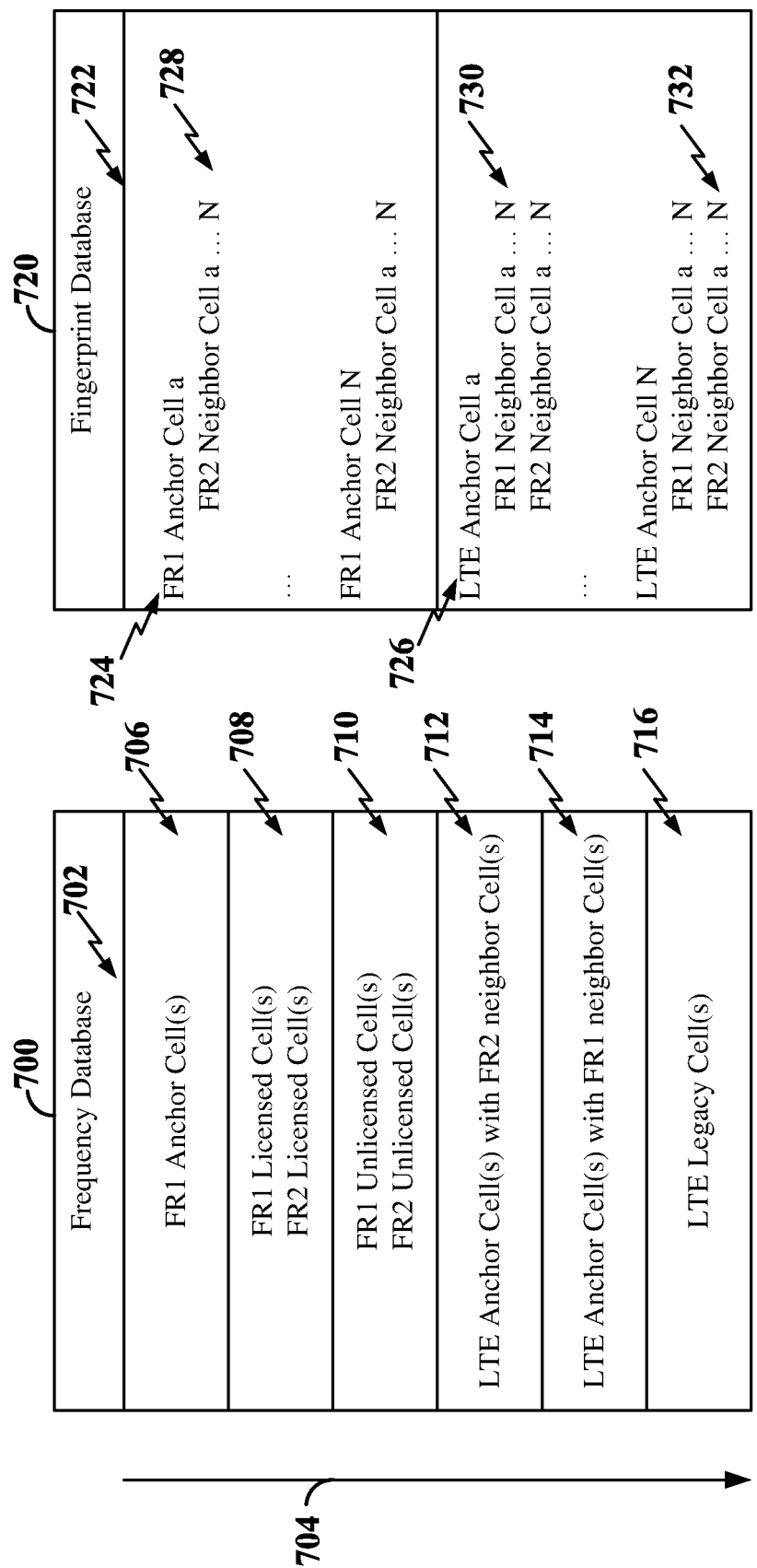
FIG. 7A is a diagram illustrating an example of a frequency database indicating an order of priority for cell selection according to some aspects.
FIG. 7B is a diagram illustrating an example of a fingerprint database for storing recent anchor cell information according to some aspects.

FIG. 7A is a diagram illustrating an example of a frequency database 700 indicating an order of priority for cell selection according to some aspects. The frequency database 700 includes a list of frequency bands 702 associated with a plurality of cells. For example, each entry in the list of frequency bands 702 may include an absolute radio frequency channel number (ARFCN) indicating the frequency band and channel number of a carrier frequency associated with the frequency band. The frequency database 700 may, for example, be pre-configured offline on a UE by the original equipment manufacturer (OEM) of the UE according to the operator network deployment. The UE may further be configured to dynamically update the frequency database 700 with additional frequency bands 702 based on system information received by the UE from the RAN.

In some examples, the UE may maintain the list of frequency bands 702 in an ascending or descending order of priority 704 of the plurality of frequency bands 702. In some examples, the order of priority may be pre-configured offline. In other examples, the UE may receive the order of priority from the wireless communication network (e.g., RAN) via at least one of dedicated signaling or broadcast signaling. The UE may use the order of priority 704 for cell acquisition or cell reselection in idle mode (e.g., radio resource control (RRC) idle mode) or for cell handover in connected mode (e.g., RRC connected mode). In the example shown in FIG. 7, the list of frequency bands 702 is arranged in an order of priority according to cell type. For example, the order of priority 704 may include a selected order of frequency bands associated with various cell types, where each cell type may be defined by a corresponding radio access technology (RAT) and frequency range (e.g., an operating frequency band within a particular frequency range, such as FR1, FR2, LTE, etc.), along with whether dual connectivity is supported.

A first cell type 706 may include those frequency bands 702 associated with cells that support dual connectivity of two or more frequency ranges associated with a latest generation RAT. Here, the latest generation RAT may include 5G NR. However, the present disclosure is not limited to 5G NR and may be applicable to future generation RATs. For example, the first cell type 706 may include FR1 anchor cells that support NR DC between the FR1 anchor cell and one or more neighboring FR2 cells. A second cell type 708 may include those frequency bands 702 associated with cells that support a frequency range of the latest generation RAT in licensed spectrum. For example, the second cell type 708 may include 5G NR cells operating on FR1 or FR2 frequency bands in licensed spectrum that do not support NR DC. In some examples, FR1 cells operating on frequency bands in licensed spectrum may be prioritized over FR2 cells operating on frequency bands in licensed spectrum (or vice-versa) within the second cell type 708. A third cell type 710 may include those frequency bands 702 associated with cells that support a frequency range of the latest generation RAT in unlicensed spectrum. For example, the third cell type 710 may include 5G NR cells operating on FR1 or FR2 frequency bands in unlicensed spectrum that do not support NR DC. In some examples, FR1 cells operating on frequency bands in unlicensed spectrum may be prioritized over FR2 cells operating on frequency bands in unlicensed spectrum (or vice-versa) within the third cell type 710. The first cell type 706, second cell type 708, and third cell type 710 collectively include the frequency bands 702 of 5G NR cells operating in standalone mode (SA).

Each of a fourth cell type 712 and a fifth cell type 714 may be associated with a non-standalone (NSA) 5G mode. Thus, both the fourth cell type 712 and fifth cell type 714 may include those frequency bands 702 associated with cells that support a legacy RAT and dual connectivity between the legacy RAT and the latest generation RAT. Here, the legacy RAT may include LTE and the latest generation RAT may include 5G NR. However, the present disclosure is not limited to NSA mode between LTE and 5G NR and may be applicable to other RAT combinations. For example, the fourth cell type 712 may include LTE anchor cells that support EN-DC between the LTE anchor cell and one or more neighboring FR2 cells. In addition, the fifth cell type 714 may include LTE anchor cells that support EN-DC between the LTE anchor cell and one or more neighboring FR1 cells. A sixth cell type 716 may include those frequency bands associated with cells that support only a legacy RAT (e.g., cells that do not support DC with the latest generation RAT).

In the example shown in FIG. 7A, the order of priority 704 includes the first cell type 706, followed by the second cell type 708, followed by the third cell type 710, followed by the fourth cell type 712, followed by the fifth cell type 714, followed by the sixth cell type 716. Thus, the order of priority 704 prioritizes SA 5G NR cells over NSA 5G NR cells and legacy LTE cells. In addition, the order of priority 704 prioritizes cells supporting NR DC over cells that do not support NR DC and cells operating in licensed spectrum over cells operating in unlicensed spectrum. However, other orders of priority 704 are possible in other configurations of the frequency database 700.

FIG. 7B is a diagram illustrating an example of a fingerprint database 720 for storing anchor cell information 722 according to some aspects. The fingerprint database 720 may be generated online by a UE and stored therein. For example, the UE may populate the fingerprint database 720 with anchor cell information 722 associated with at least one previously identified anchor cell (e.g., an anchor cell within the geographical area of the location of the UE previously identified by the UE). The UE may further update the fingerprint database 720 to remove those anchor cells that are outside of the area of the UE. In some examples, the anchor cell information 722 may be obtained by the UE based on the frequency database 700 and system information (e.g., SIB2 or SIB5) broadcast by the serving anchor cell(s) or other nearby cells. For example, the system information may include neighbor cell information (e.g., FR1 or FR2 neighbor cells) provided by the serving cell in SIB2 or other system information indicating frequency related information in the network in SIB5 (e.g., for inter-frequency cell reselection). The UE may utilize the fingerprint database 720, together with the frequency database 700, in cell selection (e.g., during cell acquisition or cell reselection in idle mode or during a handover in connected mode).

The anchor cell information 722 may include, for example, a list of one or more FR1 anchor cells 724 and a list of one or more LTE anchor cells 726. In examples in which other types of anchor cells are configured (e.g., for future generation RATs), the anchor cell information 722 may include a respective list of anchor cells for each anchor cell type. Each anchor cell included in one of the anchor cell lists 724 or 726 includes one or more corresponding neighbor cells to which the UE may be connected in a dual connection mode of the anchor cell. For example, for each FR1 anchor cell 724, the fingerprint database 720 may include a list of one or more neighbor FR2 cells 728. In addition, for each LTE anchor cell 726, the fingerprint database 720 may include a list of one or more FR1 neighbor cells 730 and a list of one or more FR2 neighbor cells 732. In examples in which both FR1 and FR2 cells are not available to an LTE anchor cell, the fingerprint database 720 may not include both FR1 cells and FR2 cells associated with the LTE anchor cell. Instead, the fingerprint database 720 may include only FR1 cells or only FR2 cells (depending on availability) associated with the LTE anchor cell.

In some examples, the anchor cell information 722 may include, for each anchor cell 724 and 726 and each corresponding neighbor cell 728, 730, and 732, the public land mobile network (PLMN), frequency band (e.g., ARFCN), physical cell identifier (PCI), global cell ID, cell reselection priority, and/or other suitable information associated with the cell (e.g., anchor cell or neighbor cell).

Figure 8:
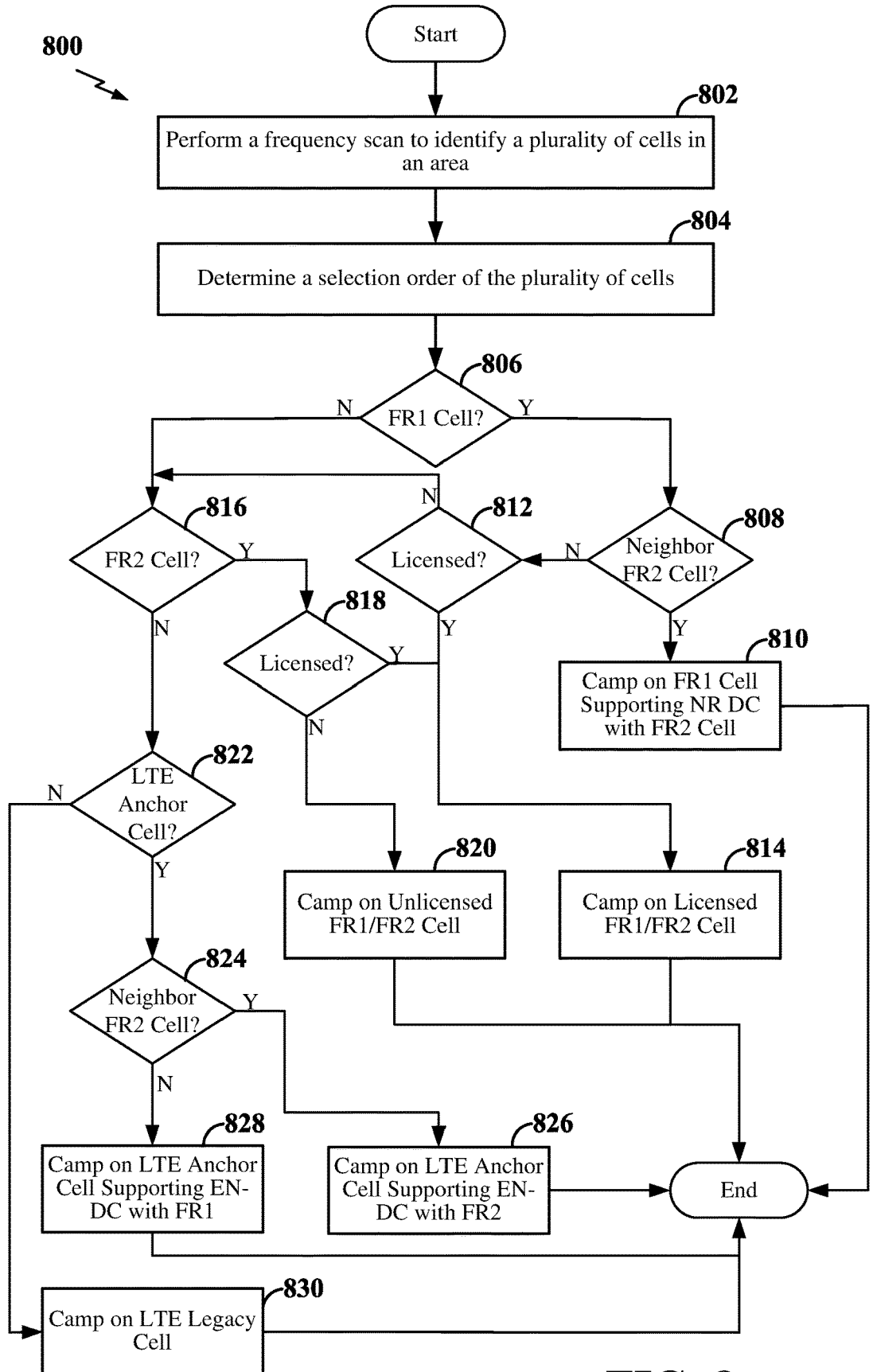
FIG. 8 is a flow chart illustrating an exemplary process for performing prioritized cell acquisition according to some aspects.

FIG. 8 is a flow chart illustrating an exemplary process for performing prioritized cell acquisition according to some aspects. As described below, some or all illustrated features may be omitted in a particular implementation within the scope of the present disclosure, and some illustrated features may not be required for implementation of all examples. In some examples, the process 800 may be carried out by the wireless communication device 1000 (e.g., a UE) illustrated in FIG. 10. In some examples, the process 800 may be carried out by any suitable apparatus or means for carrying out the functions or algorithm described below.

At block 802, the UE may perform a frequency scan to identify a plurality of cells within an area including a location of the UE (e.g., a geographical area within which the UE is located). The UE may perform the frequency scan during initial cell acquisition or upon exiting from an out-of-service state (e.g., upon powering on or re-entering a coverage area of a network). During the frequency scan, the UE may obtain a respective cell measurement (e.g., a signal strength measurement, such as the signal-to-interference-plus-noise ratio (SINR)) for each of the cells.

At block 804, the UE may then utilize the frequency database 700 shown in FIG. 7A to determine a selection order of the plurality of cells that prioritizes the latest generation RAT (e.g., 5G NR cells) and that further prioritizes cells supporting dual connectivity within a RAT. For example, the UE may determine the operating frequency band (e.g., the frequency band (ARFCN) within a frequency range associated with a RAT) of each of the identified cells. The UE may then compare the operating frequency bands of each of the identified cells with the order of priority 704 in the frequency database 700 and sort the identified cells into the selection order that follows the order of priority 704. The UE may then select a serving cell of the plurality of cells to camp on to based on the selection order. In some examples, the UE may select the serving cell further based on the anchor cell information 722 within the fingerprint database 720 shown in FIG. 7B.

For example, at block 806, the UE may determine whether the plurality of identified cells includes one or more FR1 cells (e.g., cells that operate on a frequency band within FR1). If the UE determines that there are one or more FR1 cells, the UE may further consider the cell measurements of each of the FR1 cells to determine whether one or more of the FR1 cells meet a minimum threshold. For example, the UE may compare the measured signal strength of each of the FR1 cells to a signal strength threshold. If the UE determines that there are one or more FR1 cells that have a respective signal strength greater than the signal strength threshold (Y branch of block 806), at block 808, the UE may determine whether one or more of the FR1 cells have a neighbor FR2 cell and support dual connectivity (e.g., NR DC) of the FR1 cell and the FR2 cell. For example, the UE may access the fingerprint database 720 to determine whether one or more of the FR1 cells are FR1 anchor cells listed in the fingerprint database that have one or more neighbor FR2 cells, thus providing the UE with the option of utilizing NR DC to communicate with the network.

If one or more FR1 cells are FR1 anchor cells that support NR DC with one or more neighbor FR2 cells (Y branch of block 808), at block 810, the UE may select an FR1 anchor cell on which to camp. In some examples, the UE may select the FR1 anchor cell having the highest signal strength to camp on. If there are no FR1 cells that are FR1 anchor cells with neighbor FR2 cells or there are no FR1 anchor cells that meet the minimum signal strength threshold (N branch of block 808), at block 812, the UE may determine whether there are one or more FR1 cells that operate on frequency bands in licensed spectrum (e.g., licensed FR1 cells). If there are one or more licensed FR1 cells (Y branch of block 812), at block 814, the UE may select a licensed FR1 cell on which to camp. In some examples, the UE may select the licensed FR1 cell having the highest signal strength to camp on.

If there are no licensed FR1 cells (N branch of block 812), at block 816, the UE may determine whether the plurality of identified cells includes one or more FR2 cells (e.g., cells that operate on a frequency band within FR2). If there are one or more FR2 cells (Y branch of block 816), at block 818, the UE may determine whether there are one or more FR2 cells that operate on frequency bands in licensed spectrum (e.g., licensed FR2 cells). If there are one or more licensed FR2 cells (Y branch of block 818), at block 814, the UE may select a licensed FR1 cell on which to camp. In some examples, the UE may select the licensed FR1 cell having the highest signal strength to camp on. If there are no licensed FR1 or FR2 cells (N branch of block 818), at block 820, the UE may select an unlicensed FR1 or FR2 cell on which to camp. In some examples, if there are both unlicensed FR1 and FR2 cells, the UE may select one of the unlicensed FR1 cells to camp onto. In some examples, the UE may select the unlicensed FR1 or FR2 cell having the highest signal strength to camp on.

If there are no FR2 cells (N branch of block 816), at block 822, the UE may determine whether the plurality of identified cells includes one or more LTE anchor cells (e.g., cells that operate on a frequency band within the LTE frequency range and that support dual connectivity with FR1 or FR2). For example, the UE may access the fingerprint database 720 to determine whether one or more of the plurality of cells are LTE anchor cells listed in the fingerprint database that have one or more neighbor FR1 and/or FR2 cells, thus providing the UE with the option of utilizing EN-DC to communicate with the network.

If there are one or more cells are LTE anchor cells that support dual connectivity (EN-DC) with one or more neighbor FR1 and/or FR2 cells (Y branch of block 822), at block 824, the UE may determine whether any of the one or more LTE anchor cells have at least one neighbor FR2 cell for EN-DC. If one or more LTE anchor cells have a neighbor FR2 cell for EN-DC (Y branch of block 824), at block 826, the UE may select an LTE anchor cell supporting EN-DC with at least one neighbor FR2 cell on which to camp. In some examples, the UE may select the LTE anchor cell (with a neighbor FR2 cell) having the highest signal strength to camp on. If there are no LTE anchor cells supporting EN-DC with neighbor FR2 cells (N branch of block 824), at block 828, the UE may select an LTE anchor cell supporting EN-DC with at least one neighbor FR1 cell on which to camp. In some examples, the UE may select the LTE anchor cell (with a neighbor FR1 cell) having the highest signal strength to camp on. If there are no LTE anchor cells (N branch of block 822), at block 830, the UE may select a legacy LTE cell and camp on the legacy LTE cell. In some examples, the selected legacy LTE cell may have the highest signal strength.

In examples in which the selected serving cell is an anchor cell (e.g., an FR1 anchor cell at block 810 or an LTE anchor cell at block 826 or block 828), the UE may further receive neighbor cell information from the serving cell (e.g., via SIB2) and update the fingerprint database 720 based on the neighbor cell information. For example, the neighbor cell information may include at least one additional neighbor cell supporting dual connectivity with the serving cell. In some examples, after the UE camps on an FR1 anchor cell, the UE may receive the neighbor cell information from the FR1 anchor cell to determine whether the FR1 anchor cell includes one or more neighbor FR2 cell and update the fingerprint database accordingly. In addition, after the UE camps on an LTE anchor cell, the UE may inspect SIB2 to determine if the upperLayerIndication-r15 (e.g., indicating FR1/FR2 neighbor cells) is set to TRUE. If so, the UE may update the fingerprint database accordingly. In addition, if the upperLayerIndication-r15 is set to TRUE, FR1/FR2 measurement objects may be configured by the network and a NR secondary cell group (SCG) may be added via an RRC reconfiguration message sent by the network (e.g., base station or NSA-eNB).

Figure 9:
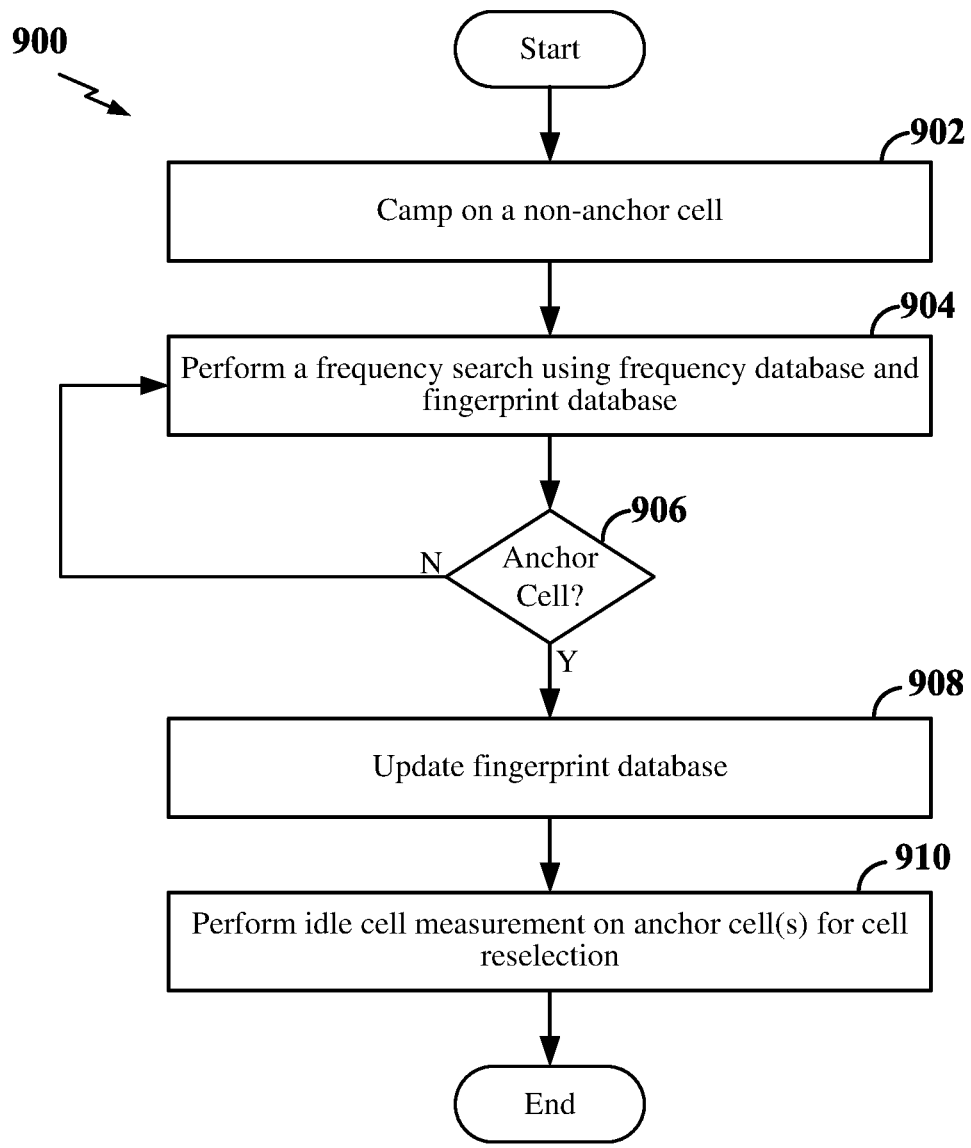
FIG. 9 is a flow chart illustrating another exemplary process for performing prioritized cell reselection according to some aspects.

FIG. 9 is a flow chart illustrating another exemplary process for performing prioritized cell reselection according to some aspects. As described below, some or all illustrated features may be omitted in a particular implementation within the scope of the present disclosure, and some illustrated features may not be required for implementation of all examples. In some examples, the process 900 may be carried out by the wireless communication device 1000 (e.g., a UE) illustrated in FIG. 10. In some examples, the process 900 may be carried out by any suitable apparatus or means for carrying out the functions or algorithm described below.

At block 902, the UE may camp on to a non-anchor cell. For example, the UE may camp on an FR1 only cell (e.g., an FR1 cell without FR2 DC capability) or a legacy LTE cell (e.g., an LTE cell without EN-DC capability).

At block 904, the UE may then perform a frequency search using the frequency database 700 shown in FIG. 7A and the fingerprint database 720 shown in FIG. 7B. In some examples, the UE may perform the frequency search periodically over time. For example, the UE may be configured to perform the frequency search every "X" ms to attempt to detect/identify additional LTE/FR1 anchor cells. In some examples, the UE may perform the frequency searches regardless of the cell type of the serving cell. For example, the UE may periodically perform frequency searches after camping onto an FR1/LTE anchor cell to detect additional anchor cells and continually update the fingerprint database.

The UE may further utilize frequency information received from the network in performing the frequency search. For example, the UE may receive neighbor cell information from the serving cell (non-anchor cell) indicating possible FR1/FR2 frequency bands configured in neighbor cells. The UE may further perform a scan of known NR DC anchor frequency bands (e.g., SA FR1/FR2 frequency bands) commonly used by the network operator for NR DC deployment. The NR DC frequency bands may be pre-configured on the UE or received from the network. The UE may further perform a scan of known LTE anchor frequency bands (e.g., NSA LTE frequency bands) commonly used for NSA (LTE) anchor deployment. For example, LTE anchor cells may be commonly deployed in LTE frequency band 3 or frequency band 39, so the UE may consider any cells operating in frequency band 3 or frequency band 39, indicated in SIB5, to be possible NSA (LTE) anchor cells.

At block 906, the UE may determine whether the UE has identified at least one additional anchor cell (FR1 or LTE) from the frequency search. For example, if the UE has identified a possible LTE anchor cell, the UE may read SIB2 from the possible LTE anchor cell and inspect the upperLayerIndication-r15. If the upperLayerIndicaton-r15 is set to TRUE, the UE can consider the possible LTE anchor cell as an LTE anchor cell.

If the UE identified at least one additional anchor cell (Y branch of block 906), at block 908, the UE may update the fingerprint database to include the at least one additional anchor cell. In addition, at block 910, the UE may configure an idle cell measurement of the at least one additional anchor cell for cell reselection. For example, based on the respective cell measurement (e.g., signal strength) of the at least one additional anchor cell, the UE may reselect from the FR1 only or LTE only cell to an FR1 anchor cell (supporting NR DC) or LTE anchor cell (supporting EN-DC) with higher reselection priority (e.g., based on the order of priority in the frequency database).

Figure 10:
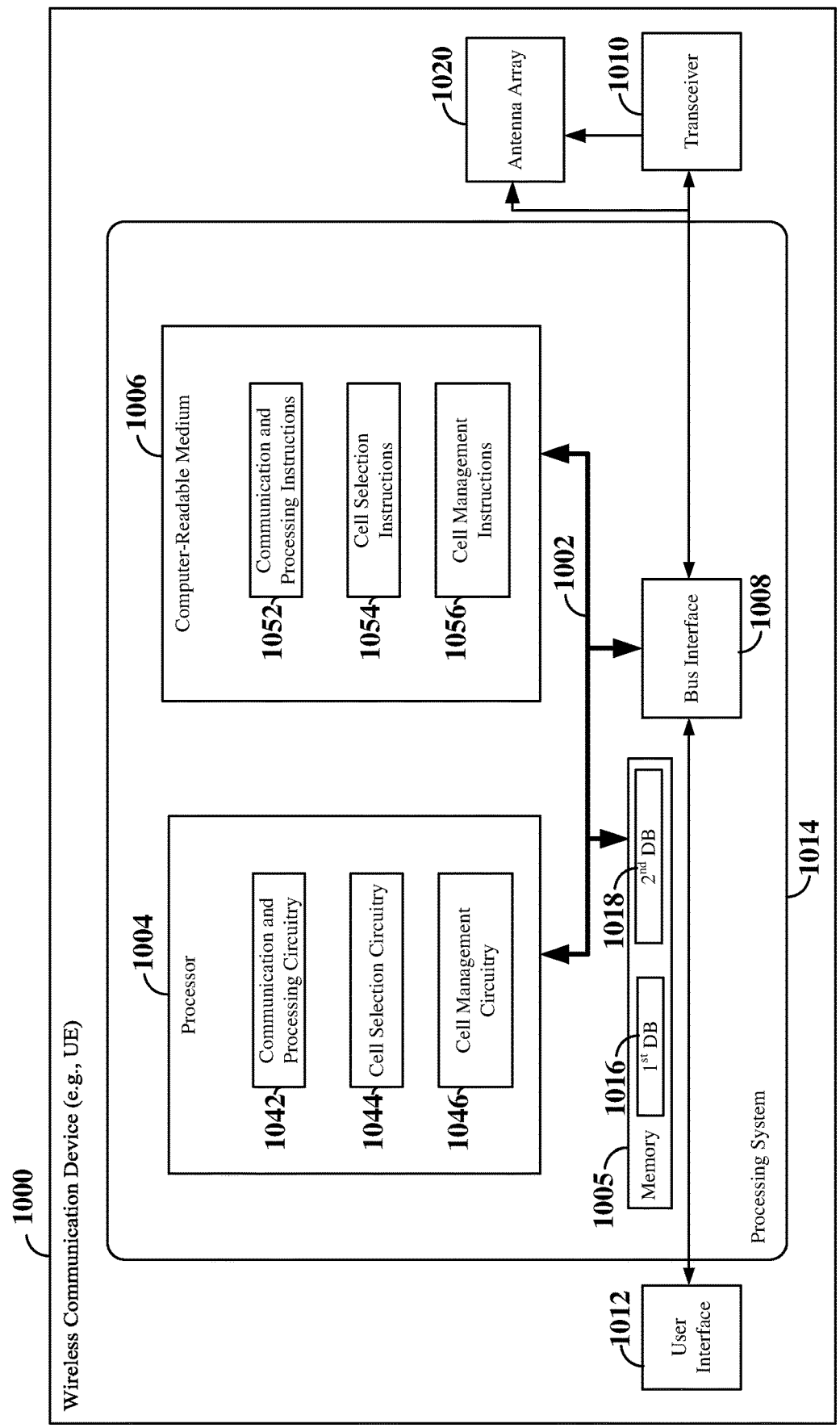
FIG. 10 is a block diagram illustrating an example of a hardware implementation for a UE employing a processing system according to some aspects.

FIG. 10 is a block diagram illustrating an example of a hardware implementation for a wireless communication device 1000 employing a processing system 1014. For example, the wireless communication device 1000 may correspond to any of the UEs or other wireless communication devices shown and described above in reference to FIGS. 1-3, 5, and/or 6.

The wireless communication device 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1000 may be configured to perform any one or more of the functions described herein. That is, the processor 1004, as utilized in the wireless communication device 1000, may be used to implement any one or more of the processes and procedures described below.

The processor 1004 may in some instances be implemented via a baseband or modem chip and in other implementations, the processor 1004 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further.

A bus interface 1008 provides an interface between the bus 1002, a transceiver 1010, and at least one antenna array 1020. The transceiver 1010 (and antenna array 1020) provides a means for communicating with various other apparatus over a transmission medium (e.g., air interface). Depending upon the nature of the apparatus, a user interface 1012 (e.g., keypad, display, touch screen, speaker, microphone, control knobs, etc.) may also be provided. Of course, such a user interface 1012 is optional, and may be omitted in some examples.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software. For example, the memory 1005 may store a first database 1016 and a second database 1018 that may be used by the processor 1004 in cell selection. For example, the first database 1016 may include a frequency database, and the second database 1018 may include a fingerprint database, as shown in FIGS. 7A and 7B.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. In some examples, the computer-readable medium 1006 may be part of the memory 1005. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include communication and processing circuitry 1042 configured to communicate with one or more base stations (e.g., gNB, or eNB) and/or TRPs via the transceiver 1010 and antenna array(s) 1020. For example, the communication and processing circuitry 1042 may be configured to communicate downlink and/or uplink signals with one or more base stations over Uu links For example, the communication and processing circuitry 1042 may be configured to generate and transmit uplink user data traffic and uplink control channels within one or more subframes, slots, and/or mini-slots to the base station(s). In addition, the communication and processing circuitry 1042 may be configured to receive downlink user data traffic and downlink control channels within one or more subframes, slots, and/or mini-slots from the base station(s). The communication and processing circuitry 1042 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1042 may include one or more transmit/receive chains.

In some implementations where the communication involves receiving information, the communication and processing circuitry 1042 may obtain information from a component of the UE 1000 (e.g., from the transceiver 1010 that receives the information via radio frequency signaling or some other type of signaling suitable for the applicable communication medium), process (e.g., decode) the information, and output the processed information. For example, the communication and processing circuitry 1042 may output the information to another component of the processor 1004, to the memory 1005, or to the bus interface 1008. In some examples, the communication and processing circuitry 1042 may receive one or more of signals, messages, other information, or any combination thereof. In some examples, the communication and processing circuitry 1042 may receive information via one or more channels. In some examples, the communication and processing circuitry 1042 may include functionality for a means for receiving. In some examples, the communication and processing circuitry 1042 may include functionality for a means for processing, including a means for demodulating, a means for decoding, etc.

In some implementations where the communication involves sending (e.g., transmitting) information, the communication and processing circuitry 1042 may obtain information (e.g., from another component of the processor 1004, the memory 1005, or the bus interface 1008), process (e.g., modulate, encode, etc.) the information, and output the processed information. For example, the communication and processing circuitry 1042 may output the information to the transceiver 1010 (e.g., that transmits the information via radio frequency signaling or some other type of signaling suitable for the applicable communication medium). In some examples, the communication and processing circuitry 1042 may send one or more of signals, messages, other information, or any combination thereof. In some examples, the communication and processing circuitry 1042 may send information via one or more channels. In some examples, the communication and processing circuitry 1042 may include functionality for a means for sending (e.g., a means for transmitting). In some examples, the communication and processing circuitry 1042 may include functionality for a means for generating, including a means for modulating, a means for encoding, etc.

In some examples, the communication and processing circuitry 1042 may be configured to receive an order of priority of a plurality of cell types from the wireless communication network via at least one of dedicated signaling (e.g., UE-specific) or broadcast signaling. For example, the order of priority may include a selected order of: a first cell type of the plurality of cell types that supports dual connectivity of a first frequency range (e.g., FR1) and a second frequency range (e.g., FR2), where the first frequency range and the second frequency range are associated with the latest generation radio access technology (RAT) (e.g., 5G NR); a second cell type of the plurality of cell types that supports the first frequency range or the second frequency range in a licensed spectrum; a third cell type of the plurality of cell types that supports the first frequency range or the second frequency range in an unlicensed spectrum; a fourth cell type of the plurality of cell types that supports a legacy RAT (e.g., LTE) and dual connectivity of the second frequency range and a third frequency range (e.g., LTE frequency range) associated with the legacy RAT; a fifth cell type of the plurality of cell types that supports the legacy RAT and dual connectivity of the first frequency range and the third frequency range; and a sixth cell type of the plurality of cell types that supports the legacy RAT and the third frequency range. In some examples, the first frequency range (e.g., FR1) includes a lower frequency range than the second frequency range (e.g., FR2). For example, the first frequency band may be FR1, the second frequency band may be FR2, and the third frequency band may be an LTE frequency band. In some examples, the first cell type, the fourth cell type, and the fifth cell type may each include an anchor cell supporting dual connectivity with a neighbor cell.

In some examples, the communication and processing circuitry 1042 may be configured to receive neighbor cell information from a serving cell. The neighbor cell information may indicate at least one additional neighbor cell supporting dual connectivity with the serving cell. In some examples, the communication and processing circuitry 1042 may be configured to receive system information including an indication of at least one additional anchor cell. For example, the system information may include a SIB2 or SIB5. The communication and processing circuitry 1042 may further be configured to execute communication and processing instructions (software) 1052 stored on the computer-readable medium 1006 to implement one or more functions described herein.

The processor 1004 may further include cell selection circuitry 1044, configured to select a serving cell for the wireless communication device 1000 (e.g., during a cell acquisition procedure, a cell reselection procedure, or a handover). The cell selection circuitry 1044 may be configured to identify a plurality of cells within an area including a location of the wireless communication device 1000 (e.g., a geographical area in which the wireless communication device is located). In some examples, the cell selection circuitry 1044 may be configured to operate together with the communication and processing circuitry 1042 to perform a frequency scan to identify the plurality of cells. For example, the cell selection circuitry 1044 may perform the frequency scan during initial cell acquisition or upon exiting from an out-of-service state (e.g., upon powering up or re-entering a coverage area of a network). During the frequency scan, the cell selection circuitry 1044 may further be configured to obtain a respective cell measurement (e.g., a signal strength measurement, such as the SINR) for each of the cells.

The cell selection circuitry 1044 may further be configured to determine a selection order of the cells based on the RATs and frequency bands supported by each of the cells. The selection order may prioritize cells associated with a latest generation RAT (e.g., 5G or later). The cell selection circuitry 1044 may further be configured to select the serving cell and camp on to the serving cell based on the selection order. In an example, the cell selection circuitry 1044 may determine the selection order based on an order of priority of a plurality of cell types of the plurality of cells and a respective cell measurement (e.g., signal strength measurement) of each of the plurality of cells. In some examples, the order of priority may be received by the communication and processing circuitry 1042 from the network via transceiver 1010. In other examples, the order of priority may be pre-configured on the wireless communication device 1000 (e.g., by the OEM according to the operator network deployment). In some examples, the order of priority may be dependent upon supported cell types of the plurality of cell types supported by the wireless communication device.

In some examples, the cell selection circuitry 1044 may select the serving cell using one or more of the first database 1016 and the second database 1018 that may be stored, for example, in memory 1005. The first database 1016 may be a frequency database that includes a list of frequency bands (e.g., ARFCNs) associated with each of the plurality of cell types in the order of priority. In some examples, the cell selection circuitry 1044 may determine the selection order of the plurality of cells using the first database. The second database 1018 may be a fingerprint database that includes anchor cell information associated with at least one previously identified anchor cell configured for dual connectivity with one or more corresponding neighbor cells. The at least one previously identified anchor cell may include at least one of the first cell type, the fourth cell type, or the fifth cell type. Here, a previously identified anchor cell is a cell that is within the geographical area of the location of the UE. The anchor cell information may include, for example, at least one of a public land mobile network (PLMN) identity (ID), absolute radio frequency channel number (ARFCN), physical cell identity (PCI), global cell ID, or cell reselection priority for the at least one previously identified anchor cell and the one or more corresponding neighbor cells associated with each of the at least one previously identified anchor cell.

In some examples, the cell selection circuitry 1044 may access the second database 1018 to identify an anchor cell of the plurality of cells having the highest priority within the first database 1016 based on the selection order of the plurality of cells. Here, the at least one previously identified anchor cell in the second database 1018 includes the anchor cell. The cell selection circuitry 1044 may then camp on the anchor cell. In some examples, the cell selection circuitry 1044 may camp on the anchor cell in response to the second database 1018 indicating the anchor cell supports dual connectivity with at least one neighbor cell thereof. For example, the neighbor cell may operate in either the second frequency range in response to the anchor cell operating in the first frequency range or in one of the first frequency range or the second frequency range in response to the anchor cell operating in the third frequency range. In examples in which the anchor cell supports FR1, the cell selection circuitry 1044 may access the second database 1018 to identify a neighbor cell that supports FR2. In examples in which the anchor cell supports an LTE frequency band, the cell selection circuitry 1044 may access the second database 1018 to identify a neighbor cell supporting either FR1 or FR2.

In some examples, the cell selection circuitry 1044 may camp on to a non-anchor cell. In this example, the cell selection circuitry 1044 may further identify at least one additional anchor cell for cell reselection. The cell selection circuitry 1044 may further be configured to execute cell selection instructions (software) 1054 stored on the computer-readable medium 1006 to implement one or more functions described herein.

The processor 1004 may further include cell management circuitry 1046, configured to populate and update the first database 1016 and the second database 1018. In some examples, the cell management circuitry 1046 may be configured to receive updates to the first database 1016 from the network (e.g., via the communication and processing circuitry 1042) and to update the first database 1016 based on the order of priority such that the order of priority is maintained in the first database 1016. In some examples, the cell management circuitry 1046 may be configured to update the second database 1018 based on neighbor cell information and/or system information received from the serving cell.

The cell management circuitry 1046 may further be configured to operate together with the communication and processing circuitry 1042 to perform frequency searches based on at least the first database 1016 and the second database 1018 to identify at least one additional anchor cell and to update the second database 1018 to include the at least one additional anchor cell. In some examples, the cell management circuitry 1046 may further be configured to utilize system information and/or known anchor frequency bands in performing the frequency search to identify the at least one anchor cell. For example, the system information (e.g., SIB5 and/or SIB2) may indicate the at least one additional anchor cell. In some examples, the cell management circuitry 1046 may be configured to perform the frequency search periodically over time. Here, the periodicity may be set by the network or configured by the wireless communication device 1000 to accommodate power and processing constraints.

The cell management circuitry 1046 may further be configured to configure an idle cell measurement (e.g., signal strength measurement) by the communication and processing circuitry 1042 of the at least one additional anchor cell discovered during the frequency search for cell reselection by the cell selection circuitry 1044 in response to a corresponding cell type of the at least one additional anchor cell having a higher priority than the serving cell based on the order of priority. The cell management circuitry 1046 may further be configured to execute cell management instructions (software) 1056 stored on the computer-readable medium 1006 to implement one or more of the functions described herein.

Figure 11:
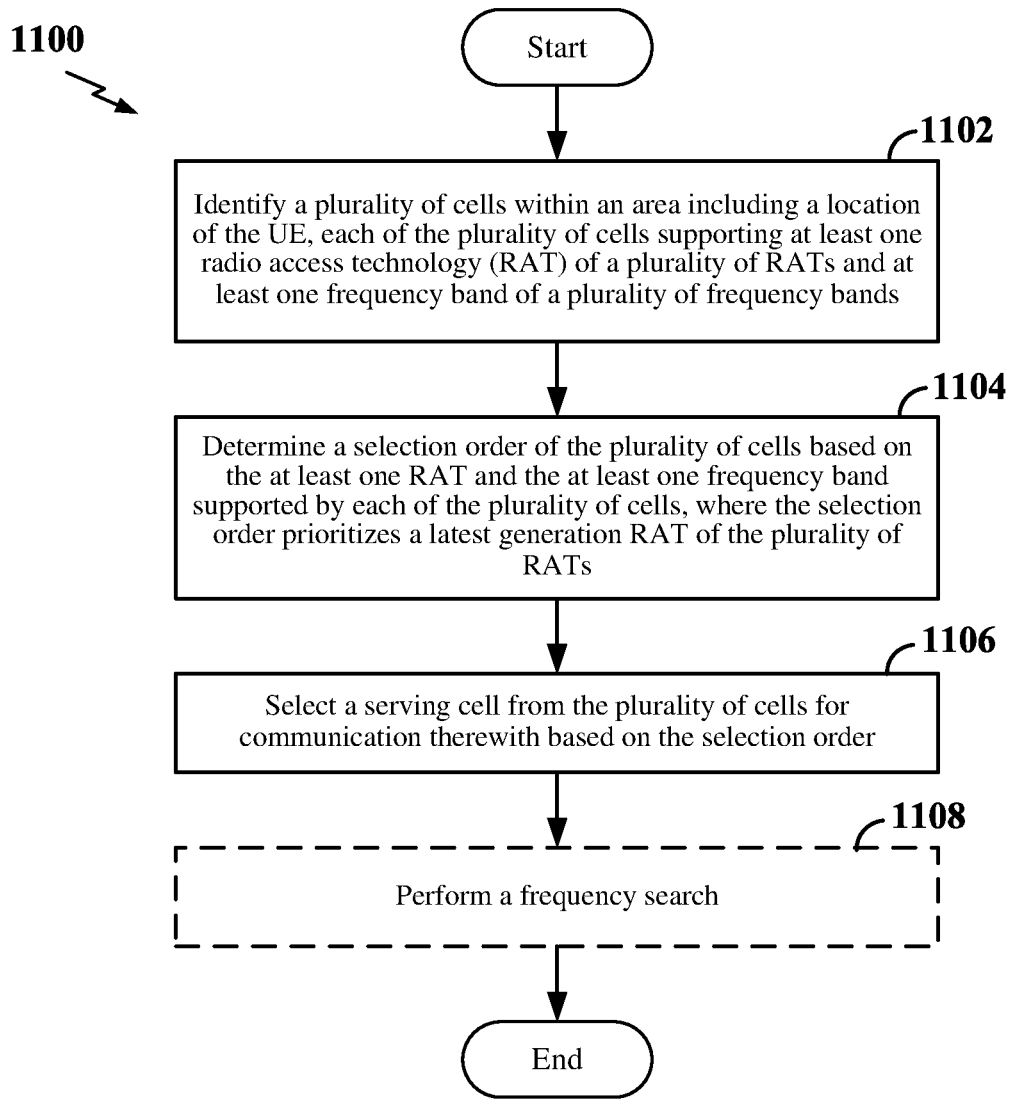
FIG. 11 is a flow chart illustrating an exemplary process for prioritized cell selection according to some aspects.

FIG. 11 is a flow chart illustrating an exemplary process for prioritized cell selection according to some aspects. As described below, some or all illustrated features may be omitted in a particular implementation within the scope of the present disclosure, and some illustrated features may not be required for implementation of all examples. In some examples, the process 1100 may be carried out by the wireless communication device 1000 (e.g., a UE) illustrated in FIG. 10. In some examples, the process 1100 may be carried out by any suitable apparatus or means for carrying out the functions or algorithm described below.

At block 1102, the wireless communication device may identify a plurality of cells within an area including a location of the UE. Each of the plurality of cells may support at least one radio access technology (RAT) of a plurality of RATs and at least one frequency band of a plurality of frequency bands. For example, the cell selection circuitry 1044, together with the communication and processing circuitry 1042, shown and described above in connection with FIG. 10 may provide a means to identify the plurality of cells.

At block 1104, the wireless communication device may determine a selection order of the plurality of cells based on the at least one RAT and the at least one frequency band supported by each of the plurality of cells. Here, the selection order prioritizes a latest generation RAT of the plurality of RATs. In some examples, the wireless communication device may determine the selection order based on an order of priority of a plurality of cell types of the plurality of cells and a respective cell measurement of each of the plurality of cells. In some examples, the order of priority may be received from the wireless communication network via at least one of dedicated signaling or broadcast signaling.

For example, the order of priority may include a selected order of a first cell type of the plurality of cell types that supports dual connectivity of a first frequency range and a second frequency range, where the first frequency range and the second frequency range are associated with the latest generation RAT, a second cell type of the plurality of cell types that supports the first frequency range or the second frequency range in a licensed spectrum, a third cell type of the plurality of cell types that supports the first frequency range or the second frequency range in an unlicensed spectrum, a fourth cell type of the plurality of cell types that supports a legacy RAT of the plurality of RATs and dual connectivity of the second frequency range and a third frequency range associated with the legacy RAT, a fifth cell type of the plurality of cell types that supports the legacy RAT and dual connectivity of the first frequency range and the third frequency range, and a sixth cell type of the plurality of cell types that supports the legacy RAT and the third frequency range. In some examples, the first frequency range includes a lower frequency range than the second frequency range. In some examples, the first cell type, the fourth cell type, and the fifth cell type each include an anchor cell supporting dual connectivity with a neighbor cell.

In some examples, the wireless communication device may maintain a first database including a list of the plurality of frequency bands associated with each of the plurality of cell types in the order of priority. The wireless communication device may further determine the selection order of the plurality of cells using the first database. In some examples, the wireless communication device may further maintain a second database within the memory comprising anchor cell information associated with at least one previously identified anchor cell configured for dual connectivity with one or more corresponding neighbor cells. Here, the at least one previously identified anchor cell may be at least one of the first cell type, the fourth cell type, or the fifth cell type. The wireless communication device may further determine the selection order of the plurality of cells using the second database. In some examples, the anchor cell information includes at least one of a public land mobile network (PLMN) identity (ID), absolute radio frequency channel number, physical cell identity (PCI), global cell ID, or cell reselection priority for the at least one recently serving anchor cell and the one or more corresponding neighbor cells associated with each of the at least one recently serving anchor cell. For example, the cell selection circuitry 1044 shown and described above in connection with FIG. 10 may provide a means to determine the selection order of the plurality of cells.

At block 1106, the wireless communication device may select a serving cell from the plurality of cells for communication therewith based on the selection order. In some examples, the wireless communication device may identify an anchor cell of the plurality of cells within the second database having a highest priority within the first database based on the order of priority. The wireless communication device may then camp on the anchor cell. In some examples, the wireless communication device may camp on the anchor cell in response to the second database indicating the anchor cell supports dual connectivity with at least one neighbor cell thereof. Here, the neighbor cell operates in either the second frequency range in response to the anchor cell operating in the first frequency range or one of the first frequency range or the second frequency range in response to the anchor cell operating in the third frequency range. For example, the cell selection circuitry 1044, together with the communication and processing circuitry 1042, shown and described above in connection with FIG. 10 may provide a means to select the serving cell.

At block 1108, the wireless communication device may optionally perform a frequency search after selecting the serving cell. In some examples, the wireless communication device may perform the frequency search based on at least the first database and the second database to identify at least one additional anchor cell for cell reselection. In some examples, the wireless communication device may further receive system information including an indication of the at least one additional anchor cell and update the second database to include the at least one additional anchor cell. In some examples, the wireless communication device may configure an idle cell measurement of the at least one additional anchor cell for cell reselection in response to a corresponding cell type of the at least one additional anchor cell having a higher priority than the serving cell based on the order of priority. In some examples, the wireless communication device may further perform the frequency search periodically over time. For example, the cell management circuitry 1046, together with the communication and processing circuitry 1042, shown and described above in connection with FIG. 10 may provide a means to perform the frequency search.

In one configuration, a wireless communication device (e.g., a UE) includes means for identifying a plurality of cells within an area including a location of the wireless communication device. Each of the plurality of cells may support at least one radio access technology (RAT) of a plurality of RATs and at least one frequency band of a plurality of frequency bands. The wireless communication device further includes means for determining a selection order of the plurality of cells based on the at least one RAT and the at least one frequency band supported by each of the plurality of cells, in which the selection order prioritizes a latest generation RAT of the plurality of RATs, and means for selecting a serving cell from the plurality of cells for communication therewith via the transceiver based on the selection order.

In one aspect, the aforementioned means for identifying a plurality of cells within an area including a location of the wireless communication device, means for determining a selection order of the plurality of cells, and means for selecting a serving cell from the plurality of cells for communication therewith based on the selection order may be the processor(s) 1004 shown in FIG. 10 configured to perform the functions recited by the aforementioned means. In another aspect, the aforementioned means may be a circuit or any apparatus configured to perform the functions recited by the aforementioned means.

The processes shown in FIGS. 8, 9, and 11 may include additional aspects, such as any single aspect or any combination of aspects described below and/or in connection with one or more other processes described elsewhere herein.

Aspect 1: A method of wireless communication in a wireless communication network, comprising, at a wireless communication device: identifying a plurality of cells within an area including a location of the wireless communication device, each of the plurality of cells supporting at least one radio access technology (RAT) of a plurality of RATs and at least one frequency band of a plurality of frequency bands; determining a selection order of the plurality of cells based on the at least one RAT and the at least one frequency band supported by each of the plurality of cells, wherein the selection order prioritizes a latest generation RAT of the plurality of RATs; and selecting a serving cell from the plurality of cells for communication therewith based on the selection order.

Aspect 2: The method of aspect 1, wherein the determining the selection order further comprises: determining the selection order based on an order of priority of a plurality of cell types of the plurality of cells and a respective cell measurement of each of the plurality of cells.

Aspect 3: The method of aspect 2, further comprising: receiving the order of priority from the wireless communication network via at least one of dedicated signaling or broadcast signaling.

Aspect 4: The method of aspect 2 or 3, wherein the order of priority comprises a selected order of: a first cell type of the plurality of cell types that supports dual connectivity of a first frequency range and a second frequency range, wherein the first frequency range and the second frequency range are associated with the latest generation RAT; a second cell type of the plurality of cell types that supports the first frequency range or the second frequency range in a licensed spectrum; a third cell type of the plurality of cell types that supports the first frequency range or the second frequency range in an unlicensed spectrum; a fourth cell type of the plurality of cell types that supports a legacy RAT of the plurality of RATs and dual connectivity of the second frequency range and a third frequency range associated with the legacy RAT; a fifth cell type of the plurality of cell types that supports the legacy RAT and dual connectivity of the first frequency range and the third frequency range; and a sixth cell type of the plurality of cell types that supports the legacy RAT and the third frequency range.

Aspect 5: The method of aspect 4, wherein the first frequency range comprises a lower frequency range than the second frequency range.

Aspect 6: The method of aspect 4 or 5, wherein the first cell type, the fourth cell type, and the fifth cell type each comprises an anchor cell supporting dual connectivity with a neighbor cell.

Aspect 7: The method of any of aspects 4 through 6, further comprising:
maintaining a first database comprising a list of the plurality of frequency bands associated with each of the plurality of cell types in the order of priority; and determining the selection order of the plurality of cells using the first database.

Aspect 8: The method of aspect 8, further comprising maintaining a second database comprising anchor cell information associated with at least one previously identified anchor cell configured for dual connectivity with one or more corresponding neighbor cells, wherein the at least one previously identified anchor cell comprises at least one of the first cell type, the fourth cell type, or the fifth cell type; and determining the selection order of the plurality of cells using the second database.

Aspect 9: The method of aspect 8, wherein the anchor cell information comprises at least one of a public land mobile network (PLMN) identity (ID), absolute radio frequency channel number, physical cell identity (PCI), global cell ID, or cell reselection priority for the at least one previously identified anchor cell and the one or more corresponding neighbor cells associated with each of the at least one previously identified anchor cell.

Aspect 10: The method of aspect 8 or 9, wherein the selecting the serving cell further comprises: identifying an anchor cell of the plurality of cells within the second database comprising a highest priority within the first database based on the order of priority, wherein the at least one previously identified anchor cell comprises the anchor cell; and camping on the anchor cell.

Aspect 11: The method of aspect 10, wherein the camping on the anchor cell further comprises: camping on the anchor cell in response to the second database indicating the anchor cell supports dual connectivity with at least one neighbor cell thereof; wherein the at least one neighbor cell operates in either the second frequency range in response to the anchor cell operating in the first frequency range or one of the first frequency range or the second frequency range in response to the anchor cell operating in the third frequency range.

Aspect 12: The method of any of aspects 8 through 11, further comprising: identifying at least one additional anchor cell for cell reselection.

Aspect 13: The method of aspect 12, further comprising: receiving system information comprising an indication of the at least one additional anchor cell; and updating the second database to include the at least one additional anchor cell.

Aspect 14: The method of aspect 12 or 13, further comprising: performing a frequency search based on at least the first database and the second database to identify the at least one additional anchor cell.

Aspect 15: The method of aspect 14, further comprising: configuring an idle cell measurement of the at least one additional anchor cell for cell reselection in response to a corresponding cell type of the at least one additional anchor cell having a higher priority than the serving cell based on the order of priority.

Aspect 16: The method of aspect 14 or 15, wherein the performing the frequency search further comprises: performing the frequency search periodically over time.

Aspect 17: A wireless communication device configured for wireless communication in a wireless communication network comprising a transceiver, a memory, and a processor coupled to the transceiver and the memory, the processor and the memory configured to perform a method of any one of aspects 1 through 16.

Aspect 18: A wireless communication device configured for wireless communication in a wireless communication network comprising at least one means for performing a method of any one of aspects 1 through 16.

Aspect 19: A non-transitory computer-readable medium having instructions stored therein for causing one or more processors of a wireless communication device configured for wireless communication in a wireless communication network to perform a method of any one of aspects 1 through 16.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional stages, components, steps, and/or functions may also be added without departing from novel features disclosed herein. The apparatus, devices, and/or components illustrated in FIGS. 1-3, 5, 5, and/or 10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present stages of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an stage in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the stages of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A wireless communication device configured for wireless communication, comprising:
   one or more memories; and
   one or more processors coupled to the one or more memories, wherein the one or more processors are configured to cause the wireless communication device to:
      identify a plurality of cells within an area including a location of the wireless communication device, each of the plurality of cells supporting at least one radio access technology (RAT) of a plurality of RATs and at least one frequency band of a plurality of frequency bands;
      determine a selection order of the plurality of cells based on the at least one RAT and the at least one frequency band supported by each of the plurality of cells and further based on an order of priority of a plurality of cell types of the plurality of cells, wherein the selection order prioritizes a latest generation RAT of the plurality of RATs, wherein the order of priority comprises a selected order of:
   a first cell type of the plurality of cell types that supports dual connectivity of a first frequency range and a second frequency range, wherein the first frequency range and the second frequency range are associated with the latest generation RAT;
   a second cell type of the plurality of cell types that supports the first frequency range or the second frequency range in a licensed spectrum;
   a third cell type of the plurality of cell types that supports the first frequency range or the second frequency range in an unlicensed spectrum;
   a fourth cell type of the plurality of cell types that supports a legacy RAT of the plurality of RATs and dual connectivity of the second frequency range and a third frequency range associated with the legacy RAT;
   a fifth cell type of the plurality of cell types that supports the legacy RAT and dual connectivity of the first frequency range and the third frequency range; and
   a sixth cell type of the plurality of cell types that supports the legacy RAT and the third frequency range; and
select a serving cell from the plurality of cells for communication therewith based on the selection order.

2. The wireless communication device of claim 1, wherein the one or more processors are further configured to cause the wireless communication device to:
   determine the selection order further based on a respective cell measurement of each of the plurality of cells.

3. The wireless communication device of claim 2, wherein the one or more processors are further configured to cause the wireless communication device to:
   receive the order of priority via at least one of dedicated signaling or broadcast signaling.

4. The wireless communication device of claim 1, wherein the first frequency range comprises a lower frequency range than the second frequency range.

5. The wireless communication device of claim 1, wherein the first cell type, the fourth cell type, and the fifth cell type each comprises an anchor cell supporting dual connectivity with a neighbor cell.

6. The wireless communication device of claim 1, wherein the one or more processors are further configured to cause the wireless communication device to:
   maintain a first database comprising a list of the plurality of frequency bands associated with each of the plurality of cell types in the order of priority; and
   determine the selection order of the plurality of cells using the first database.

7. The wireless communication device of claim 6, wherein the one or more processors are further configured to cause the wireless communication device to:
   maintain a second database comprising anchor cell information associated with at least one previously identified anchor cell configured for dual connectivity with one or more corresponding neighbor cells, wherein the at least one previously identified anchor cell comprises at least one of the first cell type, the fourth cell type, or the fifth cell type; and
   determine the selection order of the plurality of cells using the second database.

8. The wireless communication device of claim 7, wherein the anchor cell information comprises at least one of a public land mobile network (PLMN) identity (ID), absolute radio frequency channel number, physical cell identity (PCI), global cell ID, or cell reselection priority for the at least one previously identified anchor cell and the one or more corresponding neighbor cells associated with each of the at least one previously identified anchor cell.

9. The wireless communication device of claim 7, wherein the one or more processors are further configured to cause the wireless communication device to:
   identify an anchor cell of the plurality of cells within the second database comprising a highest priority within the first database based on the selection order of the plurality of cells, wherein the at least one previously identified anchor cell comprises the anchor cell; and
   camp on the anchor cell.

10. The wireless communication device of claim 9, wherein the one or more processors are further configured to cause the wireless communication device to:
    camp on the anchor cell in response to the second database indicating the anchor cell supports dual connectivity with at least one neighbor cell thereof;
    wherein the at least one neighbor cell operates in either the second frequency range in response to the anchor cell operating in the first frequency range or one of the first frequency range or the second frequency range in response to the anchor cell operating in the third frequency range.

11. The wireless communication device of claim 7, wherein the one or more processors are further configured to cause the wireless communication device to:
    identify at least one additional anchor cell for cell reselection.

12. The wireless communication device of claim 11, wherein the one or more processors are further configured to cause the wireless communication device to:
    receive system information comprising an indication of the at least one additional anchor cell; and
    update the second database to include the at least one additional anchor cell.

13. The wireless communication device of claim 12, wherein the one or more processors are further configured to cause the wireless communication device to:
    perform a frequency search based on at least the first database and the second database to identify the at least one additional anchor cell.

14. The wireless communication device of claim 13, wherein the one or more processors are further configured to cause the wireless communication device to:
    configure an idle cell measurement of the at least one additional anchor cell for cell reselection in response to a corresponding cell type of the at least one additional anchor cell having a higher priority than the serving cell based on the order of priority.

15. A method operable at a wireless communication device:
    identifying a plurality of cells within an area including a location of the wireless communication device, each of the plurality of cells supporting at least one radio access technology (RAT) of a plurality of RATs and at least one frequency band of a plurality of frequency bands;
    determining a selection order of the plurality of cells based on the at least one RAT and the at least one frequency band supported by each of the plurality of cells and further based on an order of priority of a plurality of cell types of the plurality of cells, wherein the selection order prioritizes a latest generation RAT of the plurality of RATs, wherein the order of priority comprises a selected order of:
- a first cell type of the plurality of cell types that supports dual connectivity of a first frequency range and a second frequency range, wherein the first frequency range and the second frequency range are associated with the latest generation RAT;
- a second cell type of the plurality of cell types that supports the first frequency range or the second frequency range in a licensed spectrum;
- a third cell type of the plurality of cell types that supports the first frequency range or the second frequency range in an unlicensed spectrum;
- a fourth cell type of the plurality of cell types that supports a legacy RAT of the plurality of RATs and dual connectivity of the second frequency range and a third frequency range associated with the legacy RAT;
- a fifth cell type of the plurality of cell types that supports the legacy RAT and dual connectivity of the first frequency range and the third frequency range; and
- a sixth cell type of the plurality of cell types that supports the legacy RAT and the third frequency range; and selecting a serving cell from the plurality of cells for communication therewith based on the selection order.

16. The method of claim 15, wherein the determining the selection order further comprises:
determining the selection order further based on a respective cell measurement of each of the plurality of cells.

17. The method of claim 16, further comprising:
receiving the order of priority via at least one of dedicated signaling or broadcast signaling.

18. The method of claim 15, further comprising:
maintaining a first database comprising a list of the plurality of frequency bands associated with each of the plurality of cell types in the order of priority; and
determining the selection order of the plurality of cells using the first database.

19. The method of claim 18, further comprising:
maintaining a second database comprising anchor cell information associated with at least one previously identified anchor cell configured for dual connectivity with one or more corresponding neighbor cells, wherein the at least one previously identified anchor cell comprises at least one of the first cell type, the fourth cell type, or the fifth cell type; and
determining the selection order of the plurality of cells using the second database.

20. The method of claim 19, wherein the selecting the serving cell further comprises:
identifying an anchor cell of the plurality of cells within the second database comprising a highest priority within the first database based on the order of priority, wherein the at least one previously identified anchor cell comprises the anchor cell; and
camping on the anchor cell.

21. The method of claim 20, wherein the camping on the anchor cell further comprises:
camping on the anchor cell in response to the second database indicating the anchor cell supports dual connectivity with at least one neighbor cell thereof, wherein the at least one neighbor cell operates in either the second frequency range in response to the anchor cell operating in the first frequency range or one of the first frequency range or the second frequency range in response to the anchor cell operating in the third frequency range.

22. The method of claim 19, further comprising:
identifying at least one additional anchor cell for cell reselection.

23. The method of claim 22, further comprising:
receiving system information comprising an indication of the at least one additional anchor cell; and
updating the second database to include the at least one additional anchor cell.

24. The method of claim 23, further comprising:
performing a frequency search based on at least the first database and the second database to identify the at least one additional anchor cell.

25. The method of claim 24, further comprising:
configuring an idle cell measurement of the at least one additional anchor cell for cell reselection in response to a corresponding cell type of the at least one additional anchor cell having a higher priority than the serving cell based on the order of priority.

26. The method of claim 24, wherein the performing the frequency search further comprises:
performing the frequency search periodically over time.

27. A wireless communication device configured for wireless communication, comprising:
means for identifying a plurality of cells within an area including a location of the wireless communication device, each of the plurality of cells supporting at least one radio access technology (RAT) of a plurality of RATs and at least one frequency band of a plurality of frequency bands;
means for determining a selection order of the plurality of cells based on the at least one RAT and the at least one frequency band supported by each of the plurality of cells and further based on an order of priority of a plurality of cell types of the plurality of cells, wherein the selection order prioritizes a latest generation RAT of the plurality of RATs, wherein the order of priority comprises a selected order of:
- a first cell type of the plurality of cell types that supports dual connectivity of a first frequency range and a second frequency range, wherein the first frequency range and the second frequency range are associated with the latest generation RAT;
- a second cell type of the plurality of cell types that supports the first frequency range or the second frequency range in a licensed spectrum;
- a third cell type of the plurality of cell types that supports the first frequency range or the second frequency range in an unlicensed spectrum;
- a fourth cell type of the plurality of cell types that supports a legacy RAT of the plurality of RATs and dual connectivity of the second frequency range and a third frequency range associated with the legacy RAT;
- a fifth cell type of the plurality of cell types that supports the legacy RAT and dual connectivity of the first frequency range and the third frequency range; and
- a sixth cell type of the plurality of cell types that supports the legacy RAT and the third frequency range; and means for selecting a serving cell from the plurality of cells for communication therewith based on the selection order.

28. The wireless communication device of claim 27, wherein the means for determining the selection order further comprises:
means for determining the selection order based further based on a respective cell measurement of each of the plurality of cells.

* * * * *